United States Patent
Ishida

(10) Patent No.: US 10,313,232 B2
(45) Date of Patent: Jun. 4, 2019

(54) NETWORK CONTROL DEVICE, NETWORK CONTROL METHOD, AND RECORDING MEDIUM FOR PROGRAM

(71) Applicant: NEC CORPORATION, Tokyo (JP)

(72) Inventor: Shinya Ishida, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/555,324

(22) PCT Filed: Mar. 3, 2016

(86) PCT No.: PCT/JP2016/001150
§ 371 (c)(1),
(2) Date: Sep. 1, 2017

(87) PCT Pub. No.: WO2016/143310
PCT Pub. Date: Sep. 15, 2016

(65) Prior Publication Data
US 2018/0062982 A1  Mar. 1, 2018

(30) Foreign Application Priority Data
Mar. 6, 2015 (JP) .................. 2015-044737

(51) Int. Cl.
*H04L 12/28* (2006.01)
*H04L 12/721* (2013.01)
(Continued)

(52) U.S. Cl.
CPC .............. *H04L 45/38* (2013.01); *H04L 41/12* (2013.01); *H04L 45/04* (2013.01); *H04L 45/123* (2013.01);
(Continued)

(58) Field of Classification Search
CPC ......... H04L 41/12; H04L 45/02; H04L 45/00; H04L 45/04; H04L 41/04
See application file for complete search history.

(56) References Cited

U.S. PATENT DOCUMENTS 6,400,681 B1    6/2002   Bertin et al.
7,889,675 B2    2/2011   Mack-Crane et al.
(Continued)

FOREIGN PATENT DOCUMENTS

JP      10-70571 A      3/1998
JP      2006-13926 A    1/2006
(Continued)

OTHER PUBLICATIONS

Iizawa et al. "Dynamic Multi-layer Path control Using Virutal Links," Proceedings of the 2014 IEICE General Conference Communications 2, Mar. 21, 2014, p. 162.
(Continued)

*Primary Examiner* — Siren Wei
(74) *Attorney, Agent, or Firm* — Sughrue Mion, PLLC

(57) ABSTRACT

In order to make it possible for an upper layer to receive the supply of a desired resource from a lower layer, this network control device is provided with: a database that receives a request for connection between node ports included in an upper layer network; and a hierarchical control unit that determines a link for connection between ports via a lower layer network and the performance of the link and associates and retains the results. The database receives a flow between nodes included in the upper layer network, said flow being selected in accordance with the link and the performance. The hierarchical control unit sets a flow corresponding to the link in the lower layer network when the link is included in the path of the flow.

8 Claims, 21 Drawing Sheets

(51) Int. Cl.
*H04L 12/24* (2006.01)
*H04L 12/715* (2013.01)
*H04L 12/801* (2013.01)
*H04L 12/727* (2013.01)
*H04L 12/725* (2013.01)
*H04L 12/729* (2013.01)

(52) U.S. Cl.
CPC .............. *H04L 45/64* (2013.01); *H04L 47/19* (2013.01); *H04L 45/121* (2013.01); *H04L 45/125* (2013.01); *H04L 45/302* (2013.01)

(56) References Cited

U.S. PATENT DOCUMENTS

| | | | |
|---|---|---|---|
| 2007/0276709 A1 | 11/2007 | Trimby et al. | |
| 2009/0323708 A1* | 12/2009 | Ihle | G06F 13/28 370/402 |
| 2010/0287273 A1* | 11/2010 | Nasir | H04W 48/18 709/224 |
| 2011/0032833 A1* | 2/2011 | Zhang | H04L 45/70 370/252 |
| 2013/0089005 A1* | 4/2013 | Li | H04L 45/025 370/255 |
| 2013/0117443 A1* | 5/2013 | Zhang | H04L 41/0896 709/224 |
| 2015/0263939 A1 | 9/2015 | Hasegawa et al. | |

FOREIGN PATENT DOCUMENTS

| | | |
|---|---|---|
| JP | 2007-530967 A | 11/2007 |
| JP | 2008-211551 A | 9/2008 |
| WO | 2014/054691 A1 | 4/2014 |

OTHER PUBLICATIONS

Iizawa et al., "Special Issue on SDN for Advancing ICT Systems: Multilayer Abstraction Technology Providing Integrated Control Platform for Heterogeneous Networks," NEC Technical Journal, Feb. 1, 2014, vol. 66, No. 2, pp. 44-47.

International Search Report for PCT/JP2016/001150, dated May 24, 2016 (PCT/ISA/210).

Written Opinion of the International Searching Authority for PCT/JP2016/001150, dated May 24, 2016 (PCT/ISA/237).

\* cited by examiner

FIG. 8

USER NWDB101

NODE INFORMATION101A

| Node ID |
|---|
| N11 |
| N12 |
| N13 |

PORT INFORMATION101B

| Port ID | Node ID | Link ID | Assigned |
|---|---|---|---|
| P301 | N11 | - | TRUE |
| P302 | N12 | - | TRUE |
| P303 | N12 | - | TRUE |
| P304 | N13 | - | TRUE |
| P801 | N11 | - | FALSE |
| P802 | N11 | - | FALSE |
| P803 | N12 | - | FALSE |
| P804 | N12 | - | FALSE |
| P805 | N13 | - | FALSE |
| P806 | N13 | - | FALSE |

LINK INFORMATION101C

| Link ID | Src Port ID | Dst Port ID | Established | Delay |
|---|---|---|---|---|
| L901 | P802 | P803 | FALSE | 100msec |
| L902 | P804 | P805 | FALSE | 100msec |
| L903 | P801 | P806 | FALSE | 300msec |

FLOW INFORMATION101D

| Flow ID | Path | Match | Action | Status |
|---|---|---|---|---|
| - | - | - | - | - |

FIG. 11

LAYER BOUNDARY INFORMATION

| Border ID | UpperNW Node ID | UpperNW Port ID | LowerNW Node ID | LowerNW Port ID |
|---|---|---|---|---|
| B501 | N11 | P305 | N21 | P401 |
| B502 | N11 | P306 | N21 | P402 |
| B503 | N12 | P307 | N22 | P403 |
| B504 | N12 | P308 | N22 | P404 |
| B505 | N13 | P309 | N23 | P405 |
| B506 | N13 | P310 | N23 | P406 |

FIG. 14

USER NWDB101

NODE INFORMATION101A

PORT INFORMATION101B

| Port ID | Node ID | Link ID | Assigned |
|---|---|---|---|
| P301 | N11 | - | TRUE |
| P302 | N12 | - | TRUE |
| P303 | N12 | - | TRUE |
| P304 | N13 | - | TRUE |
| P801 | N11 | L903 | FALSE |
| P802 | N11 | L901 | TRUE |
| P803 | N12 | L901 | TRUE |
| P804 | N12 | L902 | TRUE |
| P805 | N13 | L902 | TRUE |
| P806 | N13 | L903 | FALSE |

LINK INFORMATION101C

| Link ID | Src Port ID | Dst Port ID | Established | Delay |
|---|---|---|---|---|
| L901 | P802 | P803 | TRUE | 100msec |
| L902 | P804 | P805 | TRUE | 100msec |
| L903 | P801 | P806 | FALSE | 300msec |

FLOW INFORMATION101D

| Flow ID | Path | Match | Action | Status |
|---|---|---|---|---|
| F701 | L901-L902 | Node = N11<br>IN Port = P301 | Node = N13<br>OUT Port = P304 | SET |

FIG. 15

UPPER LAYER NWDB102

PORT INFORMATION 102B

| Port ID | Node ID | Link ID |
|---------|---------|---------|
| P301 | N11 | - |
| P302 | N12 | - |
| P303 | N12 | - |
| P304 | N13 | - |
| P305 | N11 | - |
| P306 | N11 | L001 |
| P307 | N12 | L001 |
| P308 | N12 | L002 |
| P309 | N13 | L002 |
| P310 | N13 | - |

NODE INFORMATION 102A

LINK INFORMATION 102C

| Link ID | Src Port ID | Dst Port ID | Delay |
|---------|-------------|-------------|-------|
| L001 | P306 | P307 | 100msec |
| L002 | P308 | P309 | 100msec |

FLOW INFORMATION 102D

| Flow ID | Path | Match | Action | Status |
|---------|------|-------|--------|--------|
| F702 | L001-L002 | Node = N11<br>IN Port = P301 | Node = N13<br>OUT Port = P304 | SET |

NETWORK CONTROL DEVICE, NETWORK CONTROL METHOD, AND RECORDING MEDIUM FOR PROGRAM

CROSS REFERENCE TO RELATED APPLICATIONS

This application is National Stage of International Application No. PCT/JP2016/001150 filed Mar. 3, 2016, claiming priority based on Japanese Patent Application No. 2015-044737, filed Mar. 6, 2015, the contents of all of which are incorporated herein by reference in their entirety.

TECHNICAL FIELD

The present invention relates to a network control device, a network control method, and a program, and relates particularly to a control technology and a design technology of a multilayer network and a multi-domain network.

BACKGROUND ART

A communication carrier network is composed of a plurality of layers (network layers). For example, a network combining a packet layer enabling efficient use of a network resource by a statistical multiplexing effect, and an optical layer suitable for long-distance and high-capacity transmission, has been constructed. Known packet layer technologies include, for example, Multi-Protocol Label Switching (MPLS) and Multi-Protocol Label Switching-Transport Profile (MPLS-TP). Further, an optical layer is generally a circuit switched network, and an Optical Transport Network (OTN) is known as a typical technology. The OTN is further internally divided into layers such as time division multiplexing (TDM) and wavelength division multiplexing (WDM) layers, based on a difference in a path switching method. In general, independent control for each layer is performed on the networks.

Meanwhile, a technology of integrating control of a multilayer network is receiving attention. The reason is that an operational cost can be reduced by automated setting of a multilayer network, and also an equipment cost can be reduced by efficient utilization of a resource, based on information about a plurality of layers. As an example, PTL 1 discloses a multilayer path control technology by centralized topology design in a two-layered network based on a packet and WDM.

Further, PTL 2 describes a method of abstracting information about a path settable in a lower layer in a form of a node or a link, and advertising the information by a routing protocol in an upper layer, in order to enable optimum path setting.

Furthermore, in a technology described in PTL 3, a measurement result of an amount of traffic flowing over an upper path (a logical path in a packet network) is acquired in a multilayer network composed of the packet network and a circuit switched network. Then, routes in the circuit switched network and the packet network are calculated, and, when congestion occurs by traffic concentration in a part of lower layer links, a route avoiding the lower layer link is calculated. PTL 4 describes a technology for establishing a connection between a source node and a destination node in a short period of time, and PTL 5 describes a technology for generating a new route to a destination node.

CITATION LIST

Patent Literature

PTL 1: Japanese Unexamined Patent Application Publication No. 2008-211551
PTL 2: U.S. Pat. No. 7,889,675
PTL 3: Japanese Unexamined Patent Application Publication No. 2006-013926
PTL 4: Japanese Unexamined Patent Application Publication No. H10-070571
PTL 5: Japanese Translation of PCT International Application Publication No. 2007-530967

SUMMARY OF INVENTION

Technical Problem

The entire disclosure of aforementioned PTLs is incorporated herein by reference thereto. The following analysis has been made by the present inventor.

In the aforementioned integrated control technologies for a multilayer network, when searching an upper layer network for a path route, only a link in a section for which path setting is already done in a lower layer is considered. For example, in the aforementioned multilayer network, paths and links have a nested configuration. Specifically, in a lower layer network, a path is set by using a node, a port, and a link in the lower layer as a network resource. In an upper layer network, a path already set in the lower layer is treated as a link between nodes, which becomes a network resource in the upper layer by adding information about a node and a port, and a path in the upper layer is set by using the resource.

For example, in the technologies, even when a path with a lower delay may be set in an upper layer by additionally setting a lower layer path and increasing upper layer links, the upper layer is not able to be aware of the entire network being in such a state. Consequently, the upper layer has to use only a resource already existing as an upper layer link for which a lower layer path is already set. Even in the multilayer path control method by PTL 1, calculation and setting of an upper layer path considering addition of a link not set in the upper layer cannot be performed.

The method of abstracting information about a path settable in a lower layer in a form of a node or a link, and advertising the information by a routing protocol in an upper layer, being described in PTL 2, is able to set an optimum path even in such a case. However, in the method in PTL 2, in a case that an upper layer path satisfying a requirement related to a bandwidth, a delay, and the like cannot be calculated even when the advertised resource information in the lower layer is included, path setting fails. This is caused by a path requirement demanded in the upper layer not being properly conveyed to the lower layer.

Further, the technologies described in PTLs 3 to 5 are not able to solve such a problem.

Accordingly, an issue is to enable an upper layer to be supplied with a desired resource from a lower layer. An object of the present invention is to provide a network control device, a network control method, and a program that are able to contribute to solution of such an issue.

Solution to Problem

A network control device according to a first aspect of the present invention includes a database that accepts a request for connecting ports on nodes included in an upper layer network, and a hierarchical control unit that obtains a link connecting the ports through a lower layer network and performance of the link, and holds the link and the performance in an associated manner. The database accepts a flow between nodes included in the upper layer network, the flow being selected depending on the link and the performance. When a route of the flow includes the link, the hierarchical control unit sets a path related to the link to the lower layer network.

A network control method according to a second aspect of the present invention includes, by a network control device, a step of accepting a request for connecting ports on nodes included in an upper layer network, a step of obtaining a link connecting the ports through a lower layer network and performance of the link, and holding the link and the performance in an associated manner, a step of accepting a flow between nodes included in the upper layer network, the flow being selected depending on the link and the performance, and a step of, when a route of the flow includes the link, setting a path related to the link to the lower layer network.

A program according to a third aspect of the present invention causes a computer to perform processing of accepting a request for connecting ports on nodes included in an upper layer network, processing of obtaining a link connecting the ports through a lower layer network and performance of the link, and holding the link and the performance in an associated manner, processing of accepting a flow between nodes included in the upper layer network, the flow being selected depending on the link and the performance, and processing of, when a route of the flow includes the link, setting a path related to the link to the lower layer network. The program may be provided as a program product recorded in a non-transitory computer-readable recording medium.

Advantageous Effects of Invention

A network control device, a network control method, and a program, according to the present invention, enable an upper layer to be supplied with a desired resource from a lower layer.

BRIEF DESCRIPTION OF DRAWINGS

FIG. 8 is a diagram exemplifying a data structure of the user NWDB after creating information in the user NWDB in accordance with the flow in FIG. 6.

FIG. 11 is a diagram exemplifying layer boundary information held by a layer boundary information management unit in the network control device according to the first example embodiment.

FIG. 14 is a diagram exemplifying a data structure of the user NWDB after setting a flow in accordance with the flow in FIG. 12.

FIG. 15 is a diagram exemplifying a data structure of the upper layer NWDB after setting a flow in accordance with the flow in FIG. 12.

DESCRIPTION OF EMBODIMENTS

First, an overview of one example embodiment will be described. A reference sign added to the overview is solely an exemplification for assisting in understanding, and is not intended to limit the present invention to the illustrated mode. Further, an arrow between blocks illustrated in a drawing indicates an example of a signal direction, and does not limit the signal direction.

Figure 1:
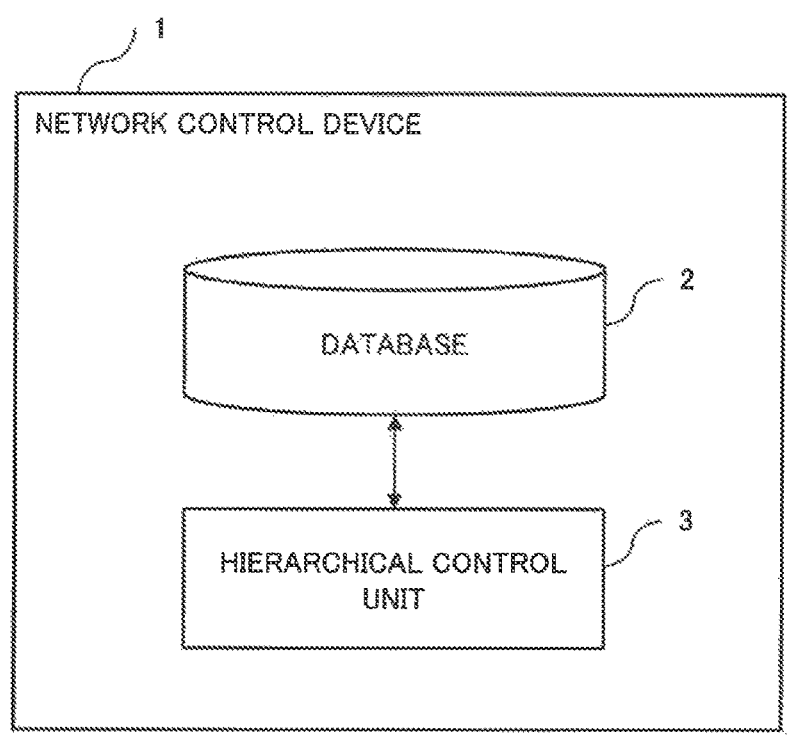
FIG. 1 is a block diagram exemplifying a configuration of a network control device according to one example embodiment.

FIG. 1 is a block diagram exemplifying a configuration of a network control device 1 according to the one example embodiment. Referring to FIG. 1, the network control device 1 includes a database 2 and a hierarchical control unit 3. An operation according to the one example embodiment is exemplified in FIG. 13.

Figure 13:
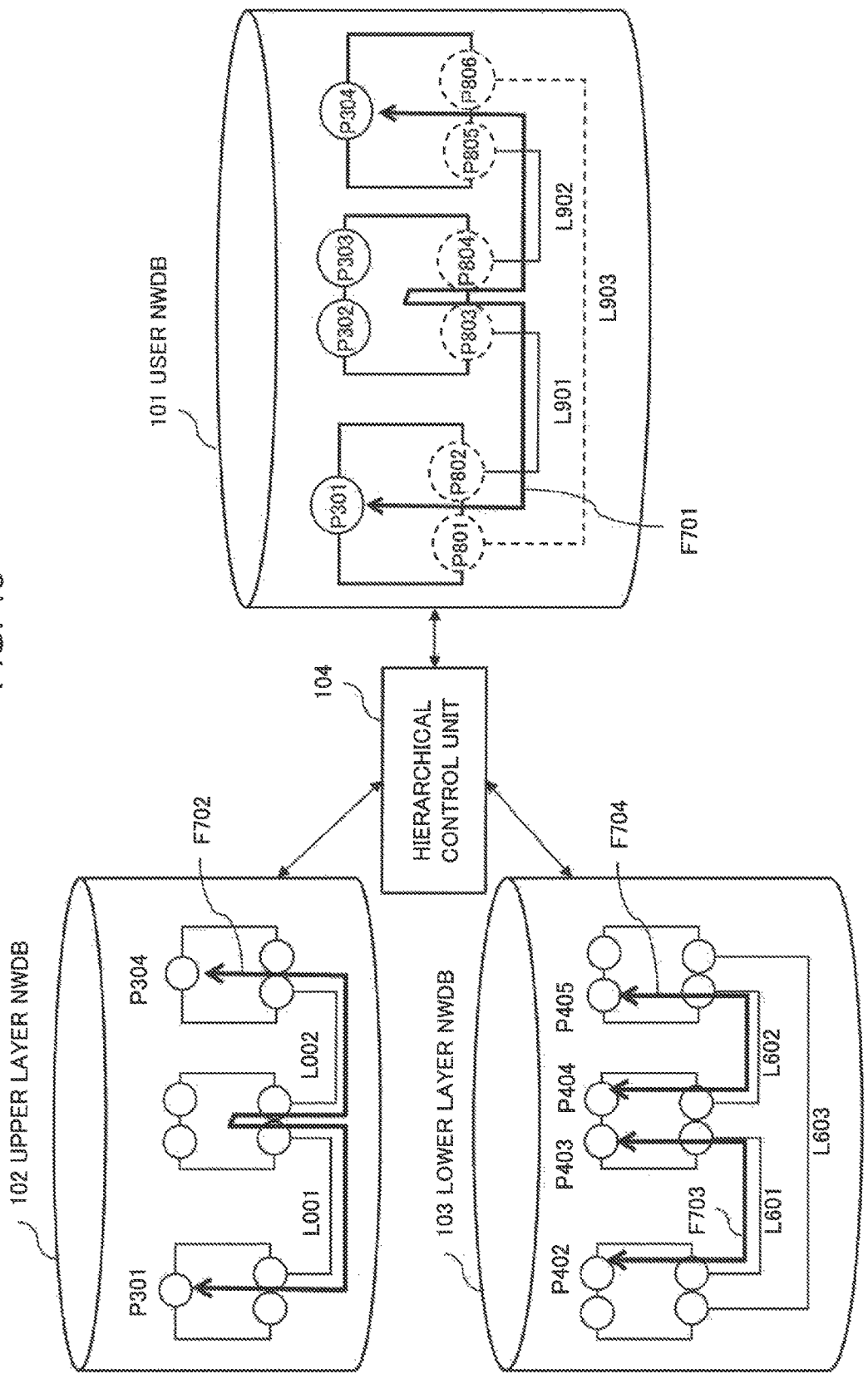
FIG. 13 is a diagram for illustrating information held by each piece of NWDB information after setting a flow in accordance with the flow in FIG. 12.

The database 2 accepts a request for connecting ports on nodes included in an upper layer network (for example, ports P802 and P803, ports P804 and P805, and ports P801 and P806 in FIG. 13). The hierarchical control unit 3 obtains a link (for example, links L901 to L903 in FIG. 13) connecting the ports through a lower layer network and performance of the link (for example, a bandwidth and a delay of the link), and holds the link and the performance in an associated manner. Additionally, the database 2 accepts a flow between nodes in the upper layer network, the flow being selected in accordance with the link and the performance. When a route of the flow includes the link (for example, the links L901 and L902 in FIG. 13), the hierarchical control unit 3 sets a flow related to the link to the lower layer network.

Specifically, when controlling a multilayer network composed of networks in a plurality of layers, the network control device 1 according to the one example embodiment performs the following procedure. Specifically, the network control device 1 generates a link in an upper layer network, based on topology information about a lower layer network and a request presented by a user for connecting ports on nodes included in the upper layer network. The request presented by a user for connecting ports on nodes included in the upper layer network is hereinafter referred to as a "potential link request," and a link generated based on a potential link request is hereinafter referred to as a "potential link." For example, generated links are the links L901 to L903 in FIG. 13. When a route provided in the upper layer network (for example, a flow F701 in FIG. 13) includes at least one potential link (for example, the potential links L901 and L902 in FIG. 13), a lower layer route related to the potential link (links L601 and L602 in FIG. 13) is set to the lower layer network.

According to the present example embodiment, the upper layer is able to previously convey a requirement of a desired resource (link) to the lower layer. By previously providing the lower layer with information required for design and preparation of a resource, the upper layer is always able to be supplied with the desired resource. Further, by collecting a requirement of a desired resource from each of a plurality of upper layers and integrating the requirements to design a path, the lower layer is able to optimize resource allocation.

Next, referring to drawings, example embodiments of the present invention will be described in detail. The example embodiments of the present invention, to be described later, provide an upper layer network with potential link information satisfying a predesignated requirement, based on topology information about a lower layer network. The upper layer network calculates a path by using a topology obtained by adding potential link information provided by the lower layer to topology information about the upper layer. Consequently, design and setting of a path considering resource information that can be provided for the upper layer by the lower layer can be efficiently performed. The example embodiments of the present invention will be described in detail, while hereinafter simplifying "multilayer network control" to "multilayer control," and using a term "flow" synonymously with "path."

First Example Embodiment

A configuration and an operation of a control device controlling a two-layered multilayer network, according to a first example embodiment of the present invention, will be described in detail.

Configuration

Figure 2:
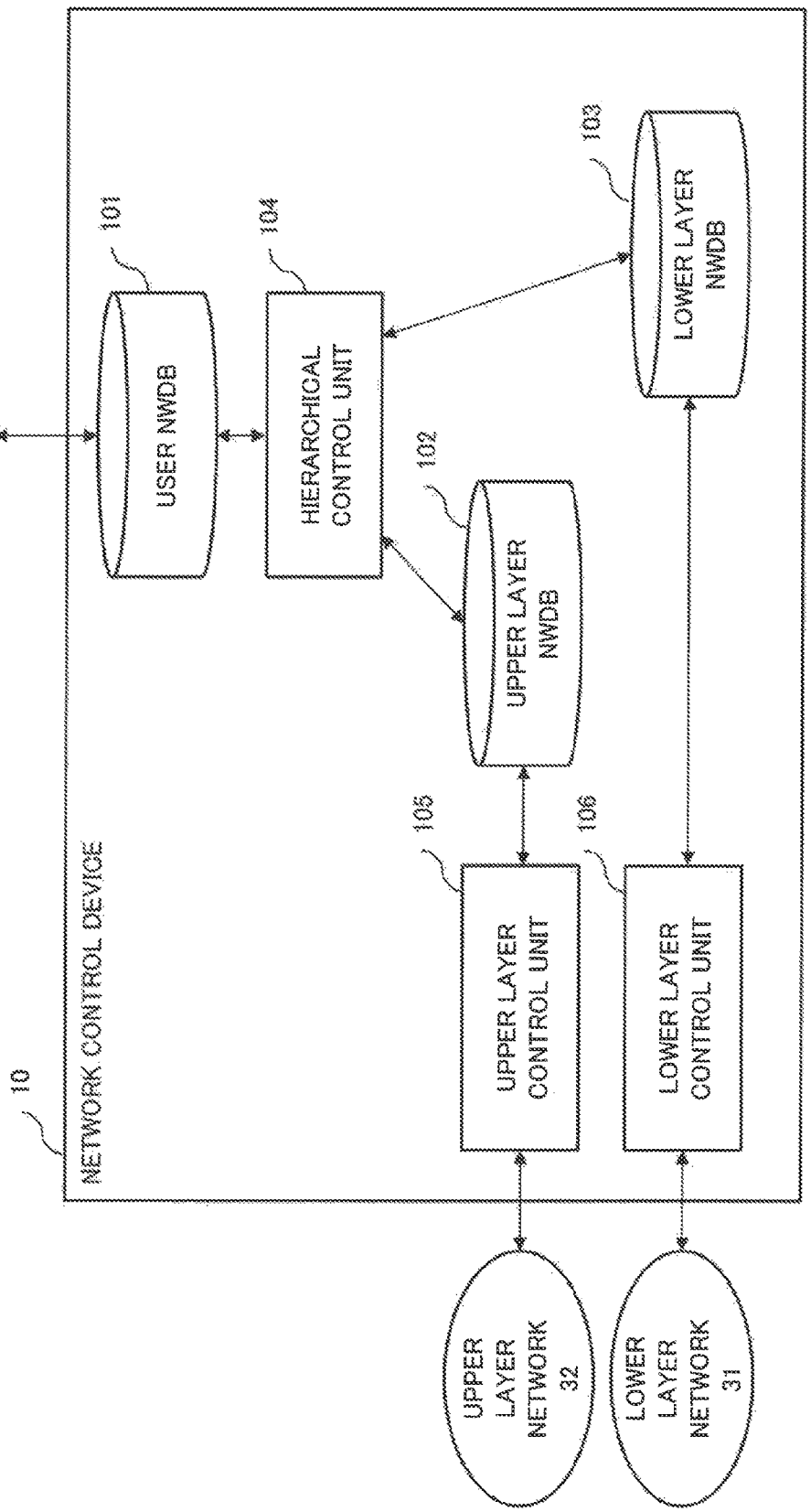
FIG. 2 is a block diagram exemplifying a configuration of a network control device according to a first example embodiment.

In FIG. 2, a network control device 10 according to the present example embodiment controls a lower layer network 31 and an upper layer network 32 in accordance with a flow request from a user request unit 20 by a user. The network control device 10 includes a user network database (NWDB) 101, an upper layer NWDB 102, a lower layer NWDB 103, and a hierarchical control unit 104. Additionally, the network control device 10 includes an upper layer control unit 105 and a lower layer control unit 106. The upper layer control unit 105 and the lower layer control unit 106 control the upper layer network 32 and the lower layer network 31, respectively, in accordance with respective information changes in the upper layer NWDB 102 and the lower layer NWDB 103. In this case, a program or a group of programs executed on a computer playing a role described in a description below may be used in place of a user. Further, while a case of a single user being a target is hereinafter described, a plurality of users may exist.

The user NWDB 101 is accessed by the user request unit 20 and stores resource information available to a user. The upper layer NWDB 102 holds information about the upper layer network 32. Meanwhile, the lower layer NWDB 103 holds information about the lower layer network 31. Each NWDB holds network information including topology information that includes a node, a port, and a link, and flow (equivalent to path) information set thereto.

As will be described later, the hierarchical control unit 104 performs control such as conversion into links in the user NWDB 101 and the upper layer NWDB 102, generation of a potential link, and registration in the user NWDB 101, based on flow information in the lower layer NWDB 103.

Figure 3:
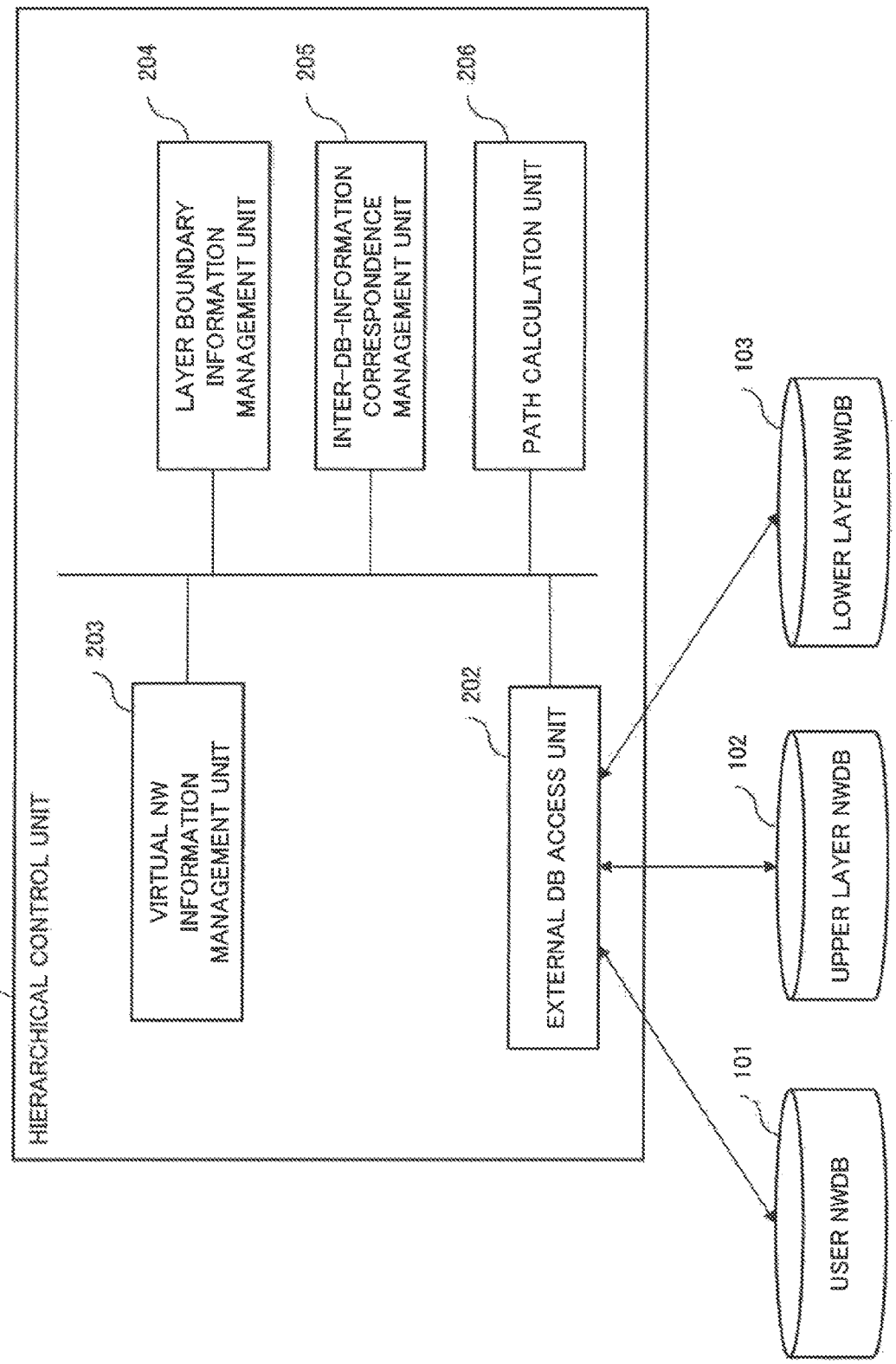
FIG. 3 is a block diagram exemplifying a configuration of a hierarchical control unit in the network control device according to the first example embodiment.

As illustrated in FIG. 3, the hierarchical control unit 104 performs access to, and acquisition or update of information in the user NWDB 101, the upper layer NWDB 102, and the lower layer NWDB 103, being external databases, through an external DB access unit 202. Additionally, the hierarchical control unit 104 includes a virtual network information management unit 203, a layer boundary information management unit 204, an inter-DB-information correspondence management unit 205, and a path calculation unit 206. The virtual network information management unit 203 creates potential link information and virtual port information in the user NWDB 101, and manages those types of information. The layer boundary information management unit 204 manages a layer boundary between an upper layer and a lower layer. The inter-DB-information correspondence management unit 205 manages correspondences between pieces of information stored in the user NWDB 101, the upper layer NWDB 102, and the lower layer NWDB 103. The path calculation unit 206 performs route calculation based on topology information in a NWDB.

Figure 4:
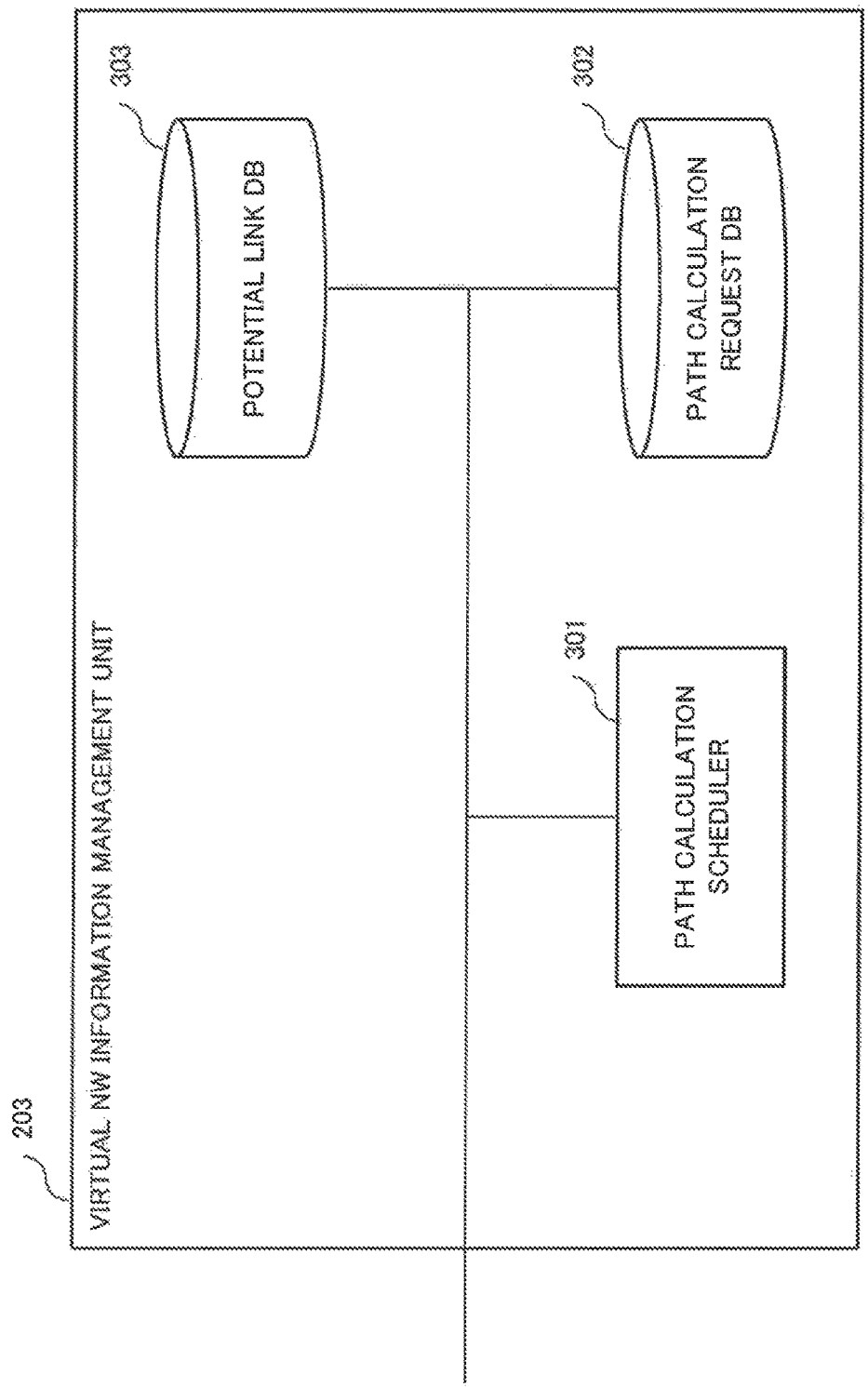
FIG. 4 is a block diagram exemplifying a configuration of a virtual network information management unit in the network control device according to the first example embodiment.

As illustrated in FIG. 4, the virtual network information management unit 203 includes a path calculation scheduler 301, a path calculation request DB 302, and a potential link DB 303. The path calculation scheduler 301 manages a path calculation event. The path calculation request DB 302 stores information about a potential link request. The potential link DB 303 holds a correspondence between a path calculated in response to a potential link request and the potential link.

The hierarchical control unit 104 may provide an equivalent function by executing, on a computer such as a central processing unit (CPU), a program stored in an unillustrated memory in the network control device 10.

Referring to a multilayer network exemplified in FIG. 5, an operation of the network control device 10 according to the present example embodiment will be described below.

Configuration Example of Multilayer Network

Figure 5:
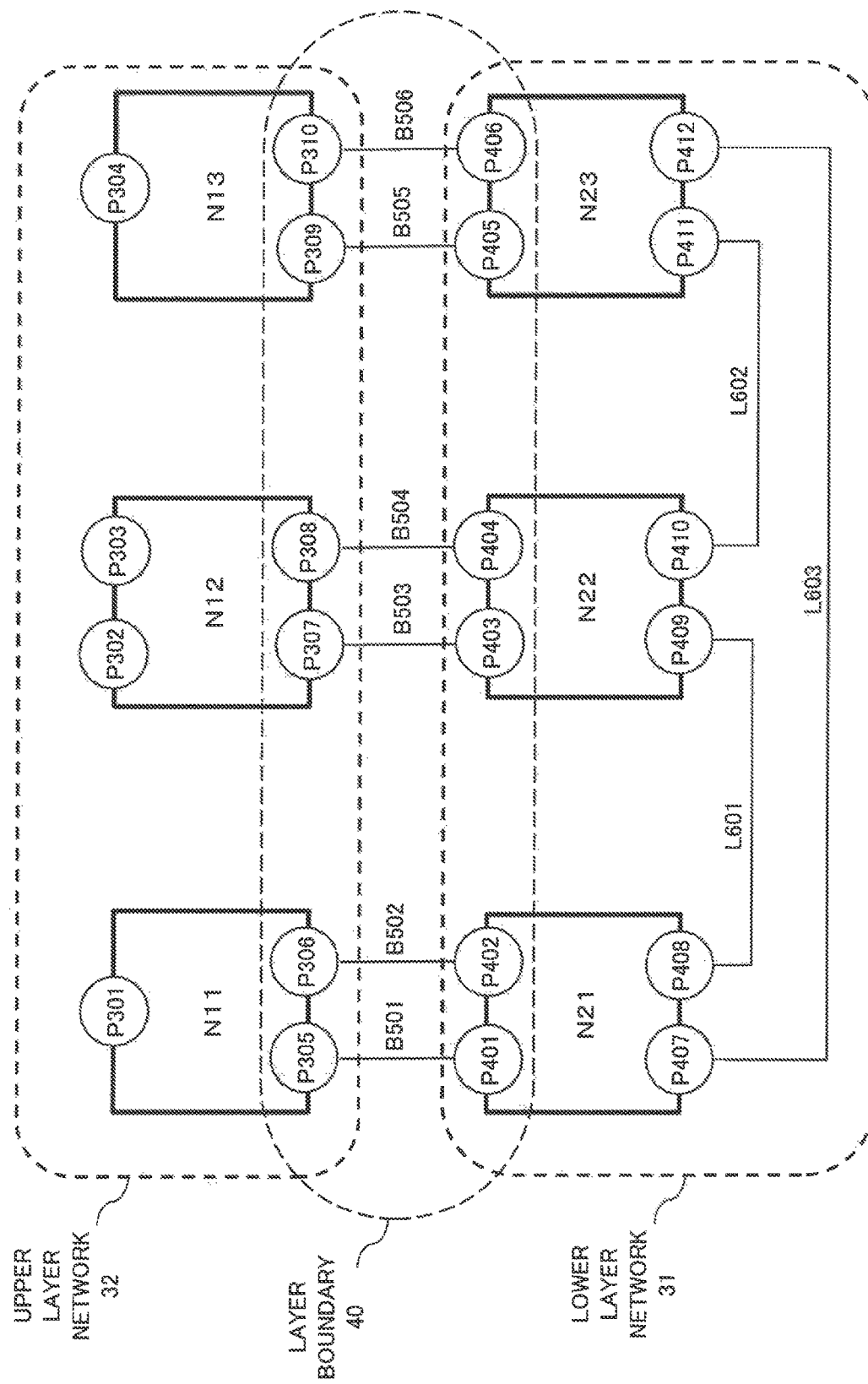
FIG. 5 is a diagram exemplifying a configuration of a multilayer network for illustrating an operation of the network control device according to the first example embodiment.

As illustrated in FIG. 5, it is assumed that the multilayer network includes the lower layer network 31, the upper layer network 32, and a layer boundary 40. Specifically, the upper layer network 32 includes nodes N11 to N13 and ports P301 to P310. Meanwhile, the lower layer network 31 includes nodes N21 to N23, ports P401 to P412, and links L601 to L603.

Furthermore, the layer boundary 40 includes boundary connections B501 to B506. The boundary connections B501 to B506 are links connecting ports. The boundary connection B501 connects the ports P305 and P401. The boundary connection B502 connects the ports P306 and P402. The boundary connection B503 connects the ports P307 and P403. The boundary connection B504 connects the ports P308 and P404. The boundary connection B505 connects the ports P309 and P405. The boundary connection B506 connects the ports P310 and P406.

The upper layer control unit 105 and the lower layer control unit 106 in the network control device 10 acquire information about the upper layer network 32 in FIG. 5 and information about the lower layer network 31 in FIG. 5 from the respective networks. Additionally, it is assumed that the upper layer control unit 105 and the lower layer control unit 106 register information about a node, a port, and a link in the upper layer NWDB 102 and the lower layer NWDB 103, respectively. Further, it is assumed that information about the layer boundary 40 is preset to the layer boundary information management unit 204 in the hierarchical control unit 104.

Operation

Referring to FIGS. 6 to FIG. 16, a potential link creation operation and a flow setting operation of the network control device 10 will be described in detail below. For example, a potential link is created in the user NWDB 101.

Potential Link Creation Operation

Figure 6:
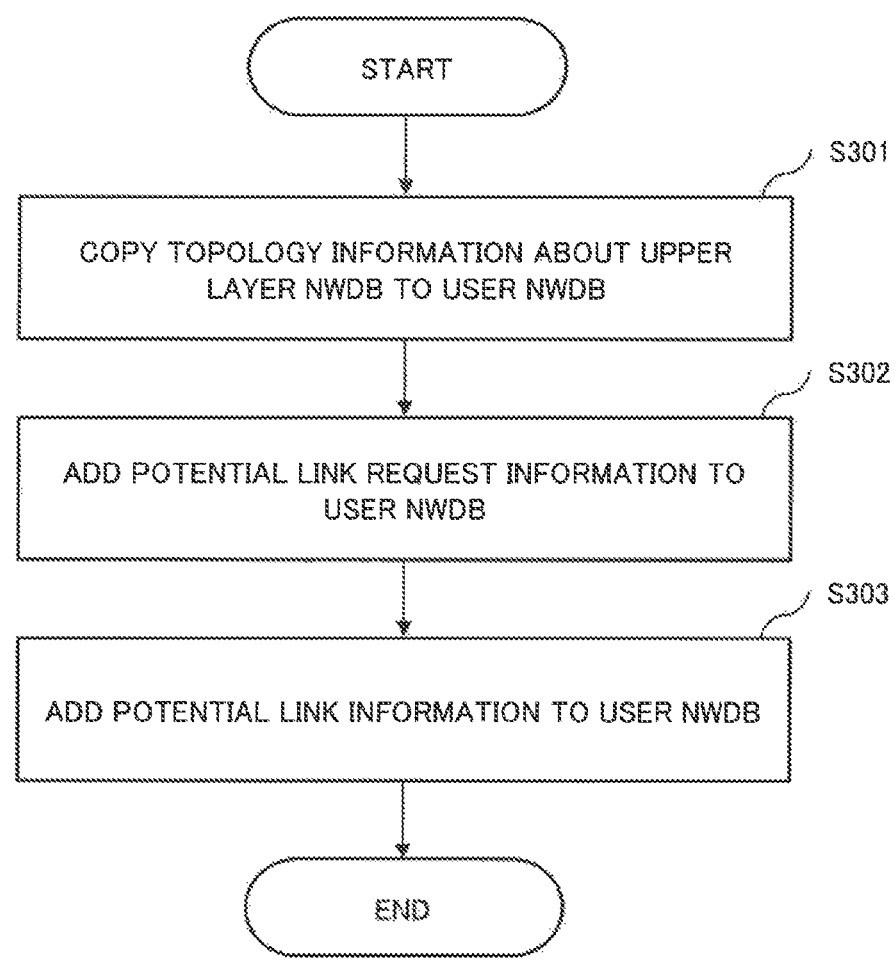
FIG. 6 is a flowchart exemplifying a potential link creation operation (an operation of creating information held by a user NWDB) of the network control device according to the first example embodiment.

In FIG. 6, first, the virtual network information management unit 203 in the hierarchical control unit 104 incorporates topology information about the upper layer from the upper layer NWDB 102 through the external DB access unit 202, and copies the information to the user NWDB 101 (Step S301). At this time, a port set to the layer boundary 40 is not copied.

Next, a user creates a potential link request in the user NWDB 101 through the user request unit 20 (Step S302). The potential link request is associated with two virtual ports and describes a requirement related to a potential link that may connect the two virtual ports. A bandwidth, a delay, reliability, priority, and the like may be listed as examples of the requirement. The user also creates a virtual port required for creating a potential link request. At this time, the user designates at least a location of the virtual port, that is, a node the virtual port is associated with, and a number of the virtual port. The virtual network information management unit 203 acquires the potential link request added to the user NWDB 101 through the external DB access unit 202. The acquisition is performed by a callback or a message notification from the user NWDB 101 to the external DB access unit 202. Alternatively, the acquisition is performed by polling to the user NWDB 101 by the external DB access unit 202. The virtual network information management unit 203 records the acquired potential link request in the path calculation request DB 302.

Next, the virtual network information management unit 203 checks connectivity of a link connecting the created virtual ports, and creates a potential link (Step S303). The path calculation scheduler 301 generates a path calculation request from the potential link request in the path calculation request DB 302. At this time, each potential link request recorded in the path calculation request DB 302 in preceding Step is read as a request for a path connecting two virtual ports in accordance with a designated requirement. The path calculation requests may include a path calculation request related to a potential link request previously stored in the user NWDB 101 and the path calculation request DB 302, in addition to a potential link request added in preceding Step. Each path calculation request includes information that can uniquely identify a related potential link request (for example, an identifier of a potential link request).

The path calculation scheduler 301 determines a time when path calculation is performed on the path calculation requests. The time may be immediately, or after a certain period of time elapses from the present time. When path calculation is performed after a certain period of time elapses from the present time, the elapsed time may be determined in a fixed or dynamic manner, based on a preprogrammed value, or a preset or predesignated value. Alternatively, the elapsed time may be determined in consideration of load status and the like of the network control device 10. Further, a time, a period of time, or information used for derivation thereof may be provided as a parameter of a potential link request created in Step S302, and the elapsed time may be determined based on the information.

The path calculation scheduler 301 passes a path calculation request to the path calculation unit 206 at a predetermined time. The path calculation unit 206 performs path calculation on the path calculation request passed from the path calculation scheduler 301. The path calculation unit 206 performs path calculation by using a heuristic method such as Constrained Shortest Path First (CSPF) and a genetic method, mathematical programming, or another path calculation algorithm. Further, the path calculation unit 206 checks connectivity of a potential link in path calculation. The connectivity check checks whether an upper layer port related to a virtual port designated as an endpoint of the potential link is physically connected to a lower layer port. The check is performed by referring to information recorded in the layer boundary information management unit 204.

For example, the nodes N11 and N12 in FIG. 5 can be connected. The port P305 or P306 on the node N11 is connected to the port P401 or P402 on the node N21 through the boundary connection B501 or B502. Similarly, the node N12 is connected to the node N22 through the boundary connection B503 or B504. At this time, when a path can be set between the node N21 and the node N22, a potential link can be set between the nodes N11 and N12.

Note that "physically connected" literally means physically connected. In a case that upper and lower layer ports are physically connected with one or more switchable devices such as switches in between, even when the two ports are not short-circuited in the devices, the ports are determined connectable as long as the two ports can be short-circuited by switching control of the devices.

The path calculation unit 206 passes the path calculation result to the virtual network information management unit 203. Each path calculation result includes information that can uniquely identify a related path calculation request or a potential link request related to the path calculation request. The virtual network information management unit 203 checks the path calculation result received from the path calculation unit 206 against the potential link request in the path calculation request DB 302. Further, the virtual network information management unit 203 creates potential link information related to the potential link request, and stores a combination of the potential link information and the path calculation result into the potential link DB 303. The potential link information includes a specification (performance such as a bandwidth, a delay, reliability, and priority) of a link when connecting the virtual ports designated by the potential link request by the path designated by the potential link request, in addition to information that can uniquely identify the potential link request. The specification value may use the path specification as is, or may use a value obtained by processing the path specification (for example, decreasing a bandwidth value from the bandwidth of the path and increasing a delay value from the delay of the path). With respect to a potential link for which a path is not discovered by the path calculation unit 206, the virtual network information management unit 203 stores the potential link into the potential link DB 303 along with information to the effect that a path does not exist, in place of path information. Alternatively, nonexistence of the potential link may be represented by not storing the potential link.

Next, in order to add the potential link information to the user NWDB 101, the path calculation scheduler 301 or the potential link DB 303 notifies the potential link information to the user NWDB 101 through the external DB access unit 202 (Step S303). The notification includes the potential link specification and information that can uniquely identify the related potential link request.

The potential link is recorded in the user NWDB 101 as a link connecting the virtual ports provided in Step S301. However, unlike a normal link, the potential link is a link not actually set, and therefore the user NWDB 101 includes information for distinguishing a difference between the two.

Figure 7:
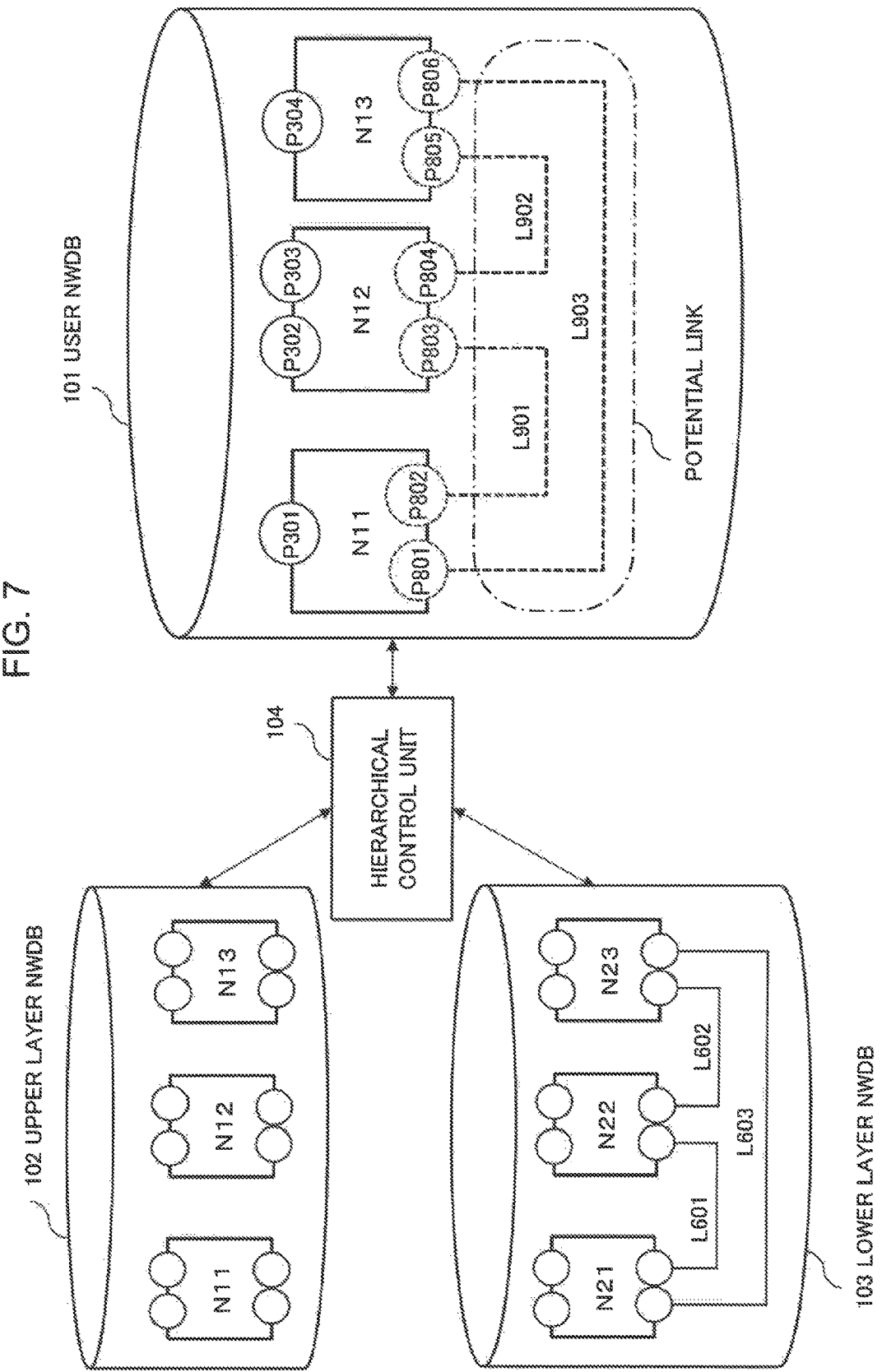
FIG. 7 is a diagram for illustrating information held by each NWDB after creating information in the user NWDB in accordance with the flow in FIG. 6.

From the description above, for example, FIG. 7 illustrates information stored in the hierarchical control unit 104 when there is a full-mesh-like potential link request between the three nodes N11, N12, and N13 in the multilayer network illustrated in FIG. 5. Specifically, the hierarchical control unit 104 stores information about upper layer nodes and information about potential links that can be connected between the nodes into the user NWDB 101. In this case, the user NWDB 101 stores the nodes N11 to N13, virtual ports P801 to P806 indicated by circles in dotted lines at the respective nodes, and the potential links L901 to L903 indicated by dotted lines.

FIG. 8 illustrates a specific data structure of the user NWDB 101 in the multilayer network in FIG. 5.

As illustrated in FIG. 8, topology information including node information 101A, port information 101B, and link information 101C is registered in the user NWDB 101. The node information 101A indicates identification information of each node. "Assigned" in the port information 101B is information indicating whether a port is a "virtual port," and TRUE indicates a real port rather than a virtual port, and FALSE indicates a virtual port. "Established" in the link information 101C is information indicating whether a link is a potential link, and TRUE indicates a set link for which a flow is actually set to the lower layer network, and FALSE indicates a potential link. Further, a sum of a link delay on a route calculated at creation of each potential link by the hierarchical control unit 104 is registered as metric information in "Delay" of a link. In other words, "Delay" indicates a link delay generated when setting a lower layer flow to the section to create a link.

Figure 9:
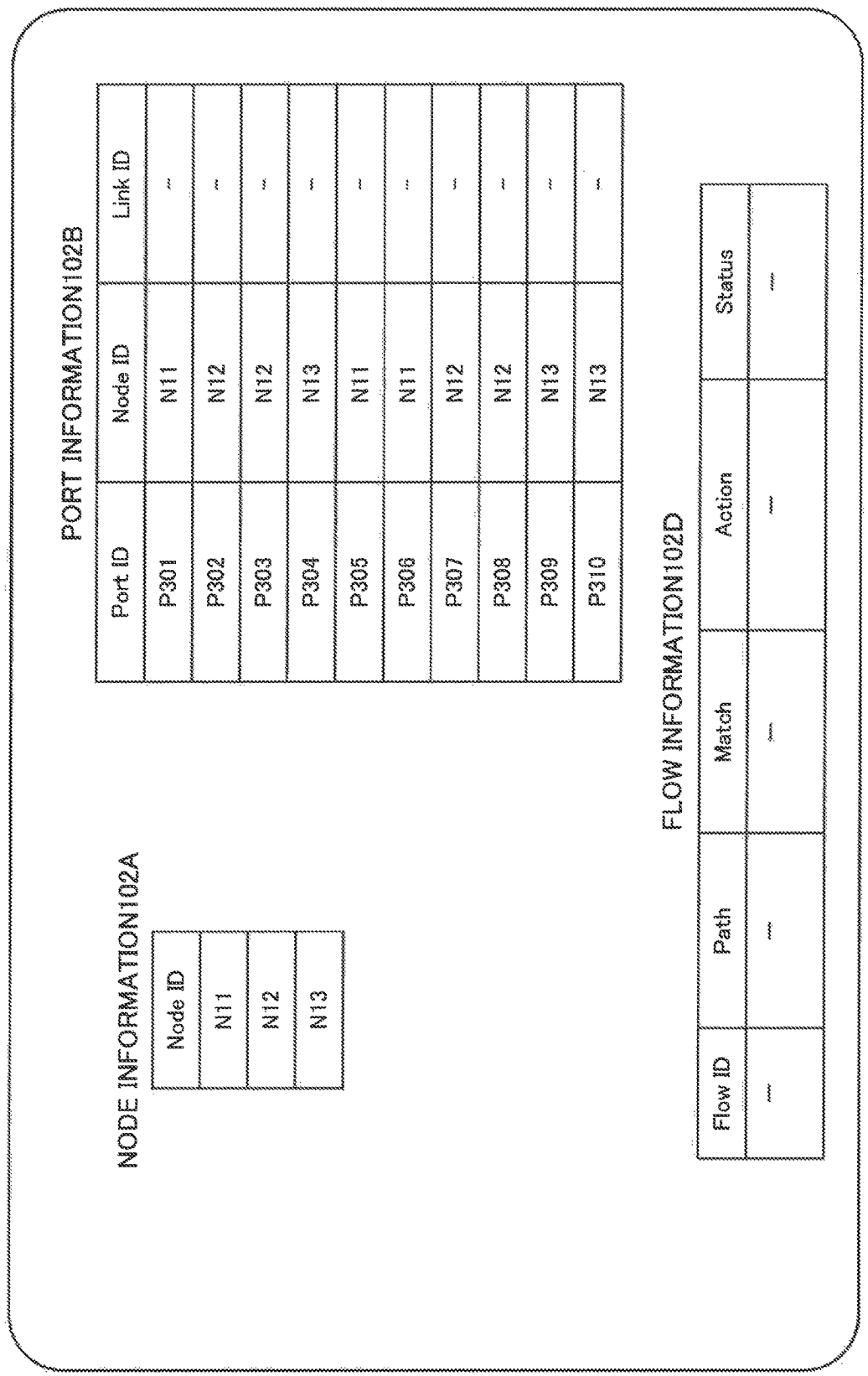
FIG. 9 is a diagram exemplifying a data structure of an upper layer NWDB after creating information in the user NWDB in accordance with the flow in FIG. 6.
Figure 10:
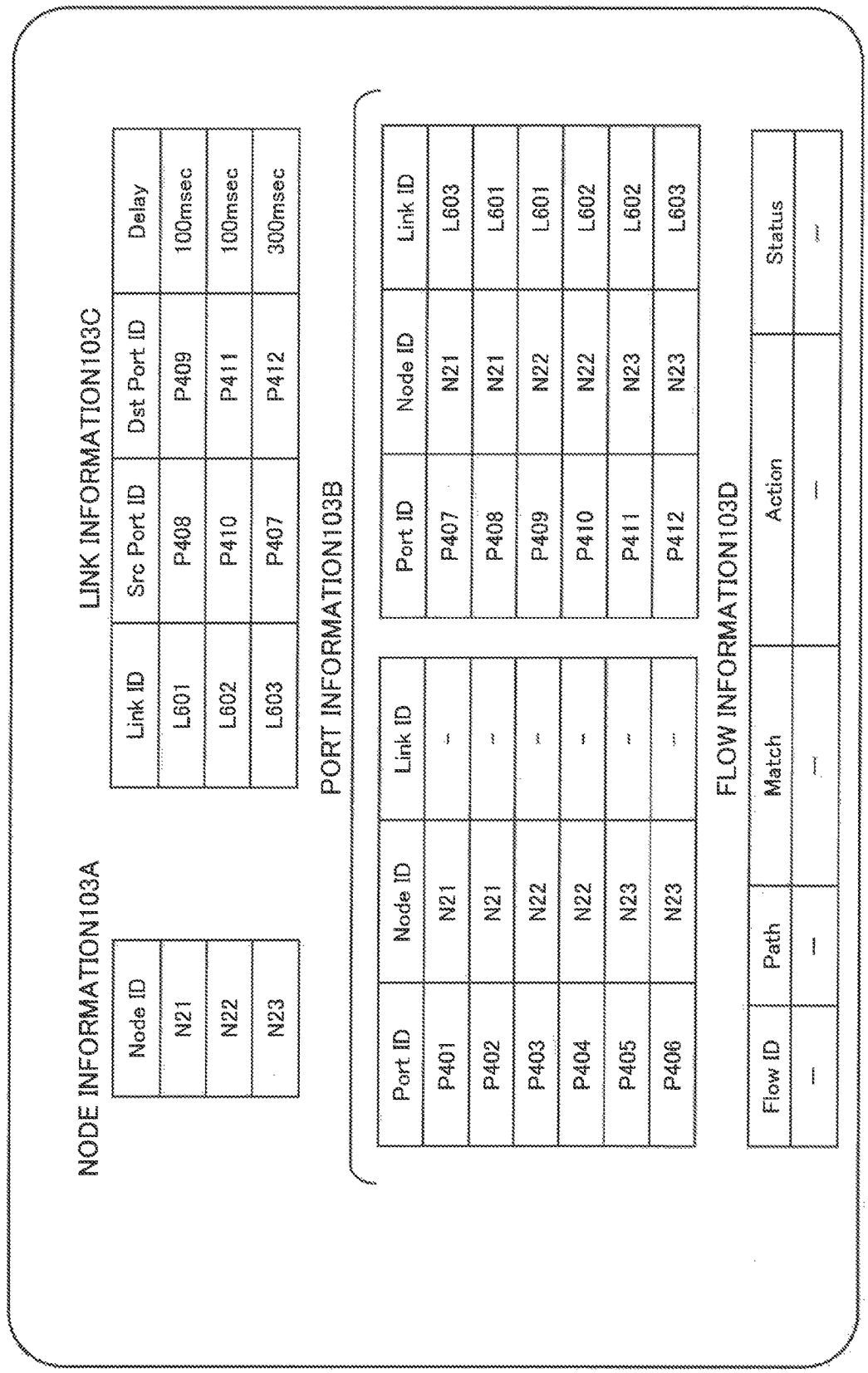
FIG. 10 is a diagram exemplifying a data structure of a lower layer NWDB after creating information in the user NWDB in accordance with the flow in FIG. 6.

FIGS. 9 and 10 illustrate topology information about the upper layer NWDB 102 and the lower layer NWDB 103 at creation of the user NWDB 101. Since a flow does not exist in the lower layer network, a link does not exist in the upper layer NWDB 102 illustrated in FIG. 9, and only node information 102A and port information 102B are registered therein. However, depending on a network configuration, a link connecting ports that are not in layer boundaries may be registered. In this case, topology information about the upper layer NWDB 102 also including the link is copied to the user NWDB 101.

Topology information including node information 103A, port information 103B, and link information 103C is registered in the lower layer NWDB 103 illustrated in FIG. 10. For example, delay information ("Delay") in the link information 103C is a propagation delay based on a physical distance of a link, and is registered by the lower layer control unit 106. While no flow is registered in the lower layer NWDB 103, there may be a case that a flow is registered depending on an initial state of the network. In this case, a potential link creation operation is performed after a set link related to each flow is created.

FIG. 11 illustrates a data structure of the layer boundary 40 held by the layer boundary information management unit 204 in the hierarchical control unit 104.

Information about a node, a port, a link, and a flow in each NWDB is not limited to the description above. For example, each port may be added with information about a maximum bandwidth, a remaining bandwidth, and a bandwidth secured for a flow, or may be added with cost information for route calculation as metric information other than a link delay. Further, for example, when a controlled network is an optical layer network, a port may be added with available resource information and unused resource information. The resource information relates to a wavelength in a WDM layer, a time slot in a TDM layer, and flow identification information in a header in a packet-switching-based layer (for example, a label in a shim header in MPLS, a virtual local area network (VLAN) identifier (VID) in a VLAN, and a combination of tuples that can be matched in OpenFlow).

Flow Setting Operation

Next, referring to FIGS. 12 to 16, an operation of the network control device 10 when a flow is added to the user NWDB 101 will be described.

First, the user request unit 20 refers to topology information in the user NWDB 101 exemplified in FIG. 8 and performs route calculation of a flow to be set, based on a requirement of the flow. In this case, it is assumed that a flow with a minimum delay between the port P301 on the node N11 and the port P304 on the node N13 (referring to FIG. 7) is requested as the flow requirement. FIG. 7 illustrates two routes as candidate routes of a flow from the node N11 to the node N13. Specifically, the candidate routes include a first route (total delay: 200 msec) routed through the links L901 (delay: 100 msec) and L902 (delay: 100 msec), and a second route (total delay: 300 msec) routed through the link L903 (delay: 300 msec). In this case, the first route has a smaller delay, and therefore the user request unit 20 selects the first route (L901 and L902). While not particularly limited as an algorithm calculating a route with a minimum delay, for example, Dijkstra's algorithm that treats a delay as a cost of a link may be considered.

Figure 12:
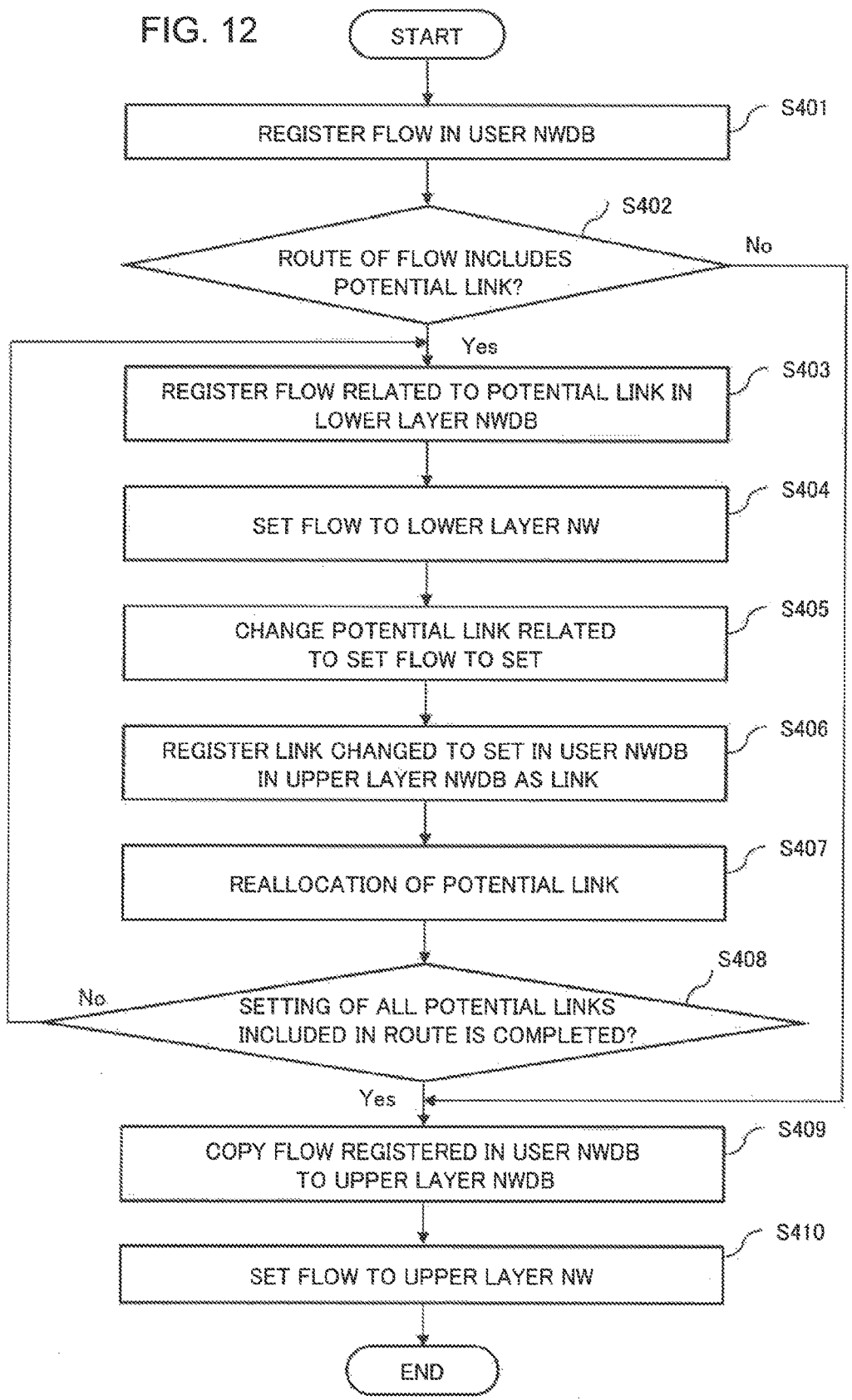
FIG. 12 is a flowchart exemplifying a flow setting operation of the network control device according to the first example embodiment.

In FIG. 12, the user request unit 20 registers a flow F701 including the selected first route (L901-L902) in the user NWDB 101 (Step S401). FIG. 13 schematically illustrates the flow F701 in the user NWDB 101. At this time, "Status" in flow information 101D in the user NWDB 101 illustrated in FIG. 14 is set to "setting in progress."

When the flow F701 is registered in the user NWDB 101 by the user request unit 20, the hierarchical control unit 104 checks whether or not a route of the flow F701 includes a potential link (Step S402). In this example, the flow F701 includes two potential links L901 and L902.

Figure 16:
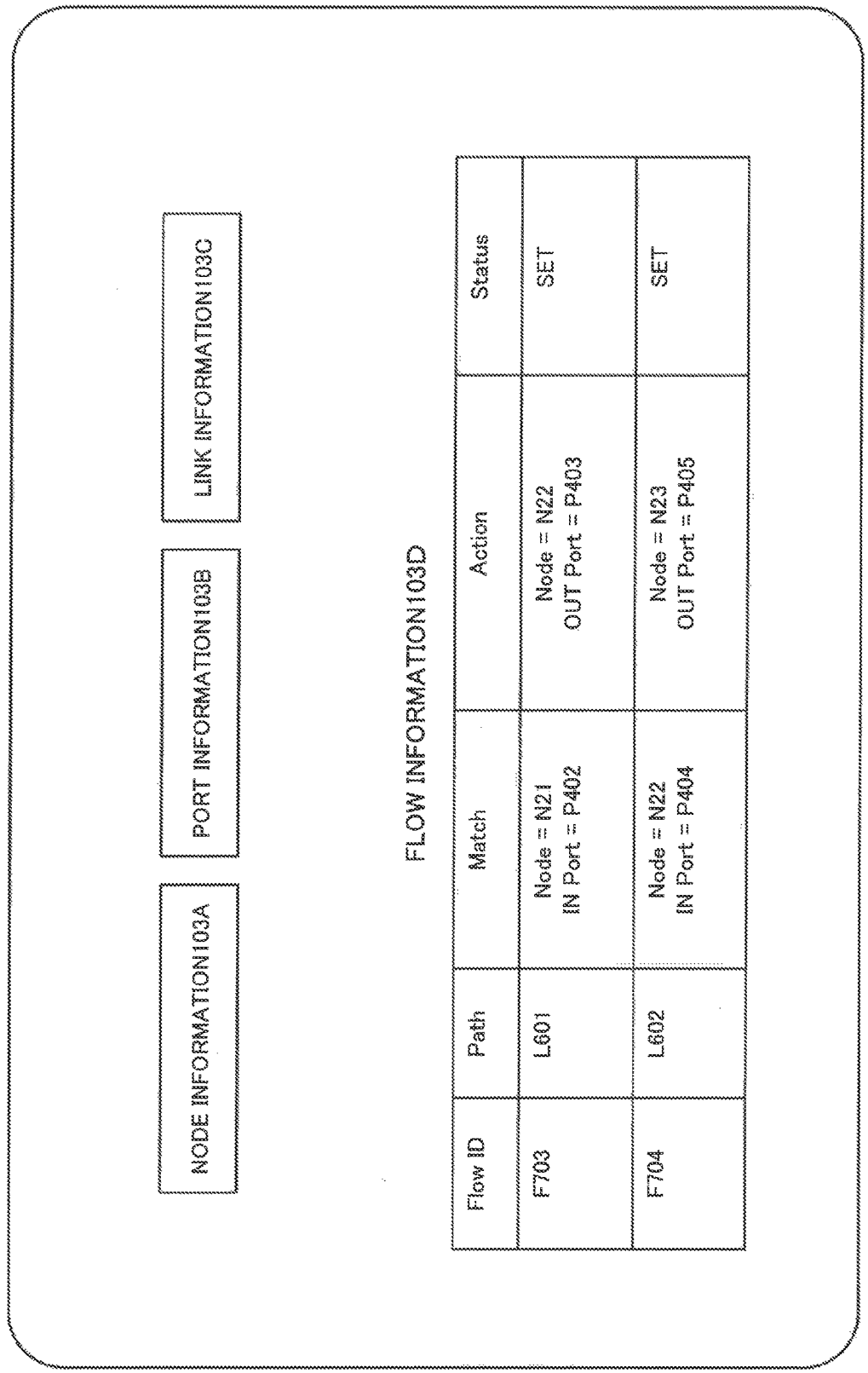
FIG. 16 is a diagram exemplifying a data structure of the lower layer NWDB after setting a flow in accordance with the flow in FIG. 12.

When a potential link is included (Yes in Step S402), the hierarchical control unit 104 first registers a flow related to a potential link (the potential link L901 in this case) in the lower layer NWDB 103 (Step S403). Specifically, referring to FIG. 13, a lower layer route related to the potential link L901 is a route following the link L601 between the nodes N21 and N22. It is assumed in this case that the port P402 on the node N21 and the port P403 on the node N22 that are included in the layer boundary 40 are selected as endpoints of the flow. Accordingly, as illustrated in FIG. 16, the hierarchical control unit 104 registers a flow F703 having the link L601 as a route and the ports P402 and P403 as endpoints, in the lower layer NWDB 103. However, at this time, "Status" of the flow F703 is set to "setting in progress."

When the flow F703 is registered in the lower layer NWDB 103, the lower layer control unit 106 actually sets a flow to each network device in the lower layer network 31 in accordance with information about the registered flow F703 (Step S404). When the flow setting is completed, as illustrated in FIG. 16, the lower layer control unit 106 changes "Status" of the flow F703 in the lower layer NWDB 103 to "set."

When the flow setting by the lower layer control unit 106 is completed, the hierarchical control unit 104 changes a potential link in the user NWDB 101 related to the set flow F703 to "set" (Step S405). Specifically, as illustrated in FIG. 14, "Established" (set) for the potential link L901 is changed to "TRUE." Further, association of the endpoints of the potential link L901, the virtual ports P802 and P803, with ports in the upper layer NWDB 102 is performed at the same time. The endpoint ports of the flow F703 in the lower layer NWDB 103 are the port P402 on the node N21 and the port P403 on the node N22. Consequently, by referring to the layer boundary information illustrated in FIG. 11, ports in the upper layer network 32 that are related to the ports are identified as the ports P306 and P307, respectively. Accordingly, the inter-DB-information correspondence management unit 205 relates the port P306 on the node N11 in the upper layer NWDB 102 to the virtual port P802 in the user NWDB 101. The inter-DB-information correspondence management unit 205 further relates the port P307 on the node N12 in the upper layer NWDB 102 to the virtual port P803 in the user NWDB 101, and holds correspondences between the ports. As illustrated in FIG. 14, the virtual network information management unit 203 in the hierarchical control unit 104 changes "Assigned" for the virtual ports P802 and P803 in the port information 101B in the user NWDB 101 to "TRUE," respectively.

Next, the hierarchical control unit 104 registers the link in the user NWDB 101, being changed to "set" in Step S405, in the upper layer NWDB 102 as a link (Step S406). Specifically, the hierarchical control unit 104 registers a link L001 related to the link L901 in the user NWDB 101, between the ports P306 and P307 in the upper layer NWDB 102, based on the previously held inter-DB-information correspondence. At that time, another type of information about the link such as a delay is also copied. Further, the inter-DB-information correspondence management unit 205 also holds a correspondence between the link L901 in the user NWDB 101 and the link L001 in the upper layer NWDB 102 as an inter-DB-information correspondence.

When the link registration in the upper layer NWDB 102 is completed, the hierarchical control unit 104 recalculates a potential link (Step S407). Specifically, out of the nodes in the upper layer network 32, a node in which a link is set to every port in the layer boundary by the previous link and flow setting is excluded from virtual port creation target nodes in the user NWDB 101. Consequently, a virtual port and a potential link of the excluded node are also deleted from the user NWDB 101. By contrast, when there is a node on which a virtual port does not exist in the user NWDB 101 despite including a port in the layer boundary to which a link is not set in the upper layer, a virtual port and a potential link are added. For example, when potential links are created in a full mesh, a virtual port is added to every virtual port creation target node including the node, and a potential link is created by an operation similar to Step S303 in FIG. 6. When the potential link reallocation eliminates a potential link passing a flow registered in the user NWDB 101, a setting failure of the flow occurs, and therefore the "Status" information of the flow is changed to "setting failure."

In this case, for example, the user request unit 20 resets the flow to another route by using the topology information in the user NWDB 101.

The hierarchical control unit 104 performs Steps S403 to S407 described above on every potential link through which the first flow registered in the user NWDB 101 is routed (Step S408). As described above, processing on the potential link L901 out of the two potential links L901 and L902 that are included in the flow F701 is completed, but the potential link L902 still remains (No in Step S408). Accordingly, the hierarchical control unit 104 performs Steps S403 to S407 described above on the potential link L902.

When path setting is completed for every potential link (Yes in Step S408), or a potential link is not included in the route of the flow F701 (No in Step S402), the hierarchical control unit 104 copies information about the flow registered in the user NWDB 101 to the upper layer NWDB 102 (Step S409). In this example, while information about the flow F701 in the user NWDB 101 is copied and registered in flow information 102D in the upper layer NWDB 102 as a flow F702, "Status" of the flow F702 indicated in FIG. 15 is set to "setting in progress."

When the flow is registered in the upper layer NWDB 102, the upper layer control unit 105 actually sets the flow to each network device in the upper layer network 32 in accordance with the registered information about the flow F702 (Step S410). When the setting is completed, the upper layer control unit 105 changes the "Status" information of the flow F702 in the upper layer NWDB 102 to "set" as illustrated in FIG. 15. When detecting the change, the hierarchical control unit 104 changes "Status" of the flow F701 in the user NWDB 101 to "set" as illustrated in FIG. 14. The user request unit 20 is able to become aware of the flow setting completion by the flow information change in the user NWDB 101.

Through the operation described above, the hierarchical control unit 104 performs required flow setting on the lower layer network 31 and the upper layer network 32 as illustrated in FIG. 13. As described above, the data structures of the user NWDB 101, the upper layer NWDB 102, and the lower layer NWDB 103 that are illustrated in FIG. 13 are exemplified in FIGS. 14, 15, and 16, respectively.

In the user NWDB 101 illustrated in FIG. 14, the flow information 101D is added in addition to the topology information (101A, 101B, and 101C). Further, "Established" information of a set link is set to "TRUE," and "Assigned" information of a port associated with a port in the upper layer network is set to "TRUE." Thus, when a flow is added to the user NWDB 101, the network control device 10 performs required setting on the lower layer network 31 and the upper layer network 32, respectively.

In the upper layer NWDB 102 illustrated in FIG. 15, links L001 and L002 are added as a result of a flow being set to the lower layer network 31. Further, information about the set flow is also added.

In the lower layer NWDB 103 illustrated in FIG. 16, flow information 103D is added in addition to the topology information (103A, 103B, and 103C). "Path" holds route information about the flow in a form of a list of a link through which the flow is routed. Further, "Match" holds information about a node and a port at the input side endpoint of the flow, and "Action" holds information about a node and a port at the output side endpoint of the flow.

Effect

As described above, the first example embodiment of the present invention creates a potential link in the user NWDB 101 and enters information, such as a delay, anticipated when a flow is set to the lower layer.

Consequently, even in a state that a flow is not yet set to the lower layer, and no link exists in the upper layer, a user is able to determine a route satisfying a requirement of a flow to be set, and perform path setting, considering link addition. In other words, path setting considering link addition to a section without a link in the lower layer network 31 can be performed.

Second Example Embodiment

A network control device according to a second example embodiment of the present invention has a configuration similar to that of the network control device according to the first example embodiment. A difference in operation between the network control device according to the present example embodiment and the network control device according to the first example embodiment will be described below.

Operation

Figure 17:
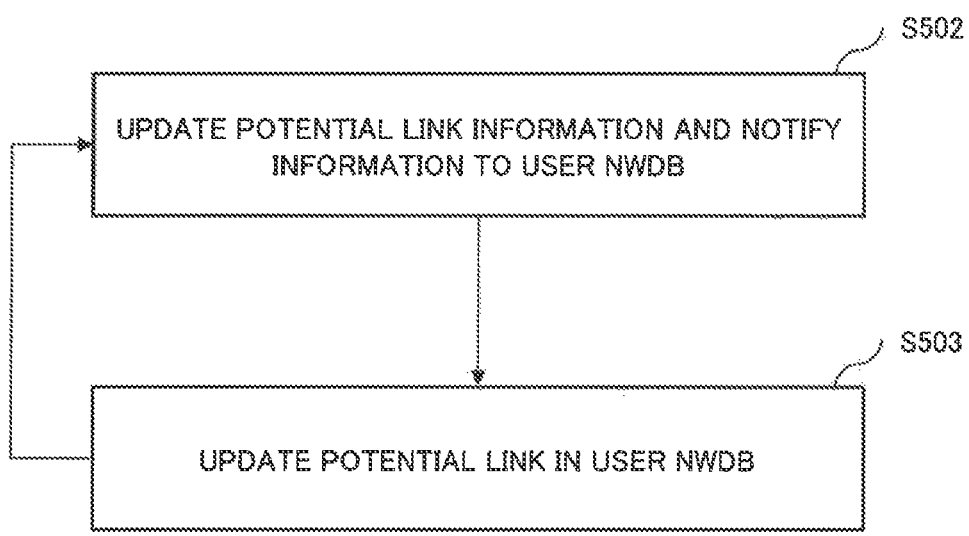
FIG. 17 is a flowchart illustrating a potential link update operation of a network control device according to a second example embodiment.

The network control device according to the second example embodiment performs an operation illustrated in FIG. 17, in addition to the operation described in the first example embodiment.

The virtual network information management unit 203 periodically updates potential link information (Step S502). Processing performed in Step S502 is equivalent to Step S302 according to the first example embodiment.

The virtual network information management unit 203 notifies most recent potential link information to the user NWDB 101 (Step S503). Processing performed in Step S503 is equivalent to Step S303 according to the first example embodiment.

Time intervals at which these Steps are repeatedly performed are determined by the path calculation scheduler 301. The time interval may be determined in a fixed or dynamic manner, based on a preprogrammed value, or a preset or predesignated value, or may be determined in consideration of load status and the like of the network control device 10. Further, a time, a period of time, or information used for derivation thereof may be provided as a parameter of a potential link request created in Step S302, and the time interval may be determined based on the information.

Effect

The second example embodiment of the present invention is able to continue updating potential link information recorded in the user NWDB 101. Consequently, the effect according to the first example embodiment can be sustained.

Third Example Embodiment

A network control device according to a third example embodiment of the present invention has a configuration similar to the configurations of the network control devices according to the first and second example embodiments. A difference in operation between the present example embodiment and the first and second example embodiments will only be described.

Operation

Figure 18:
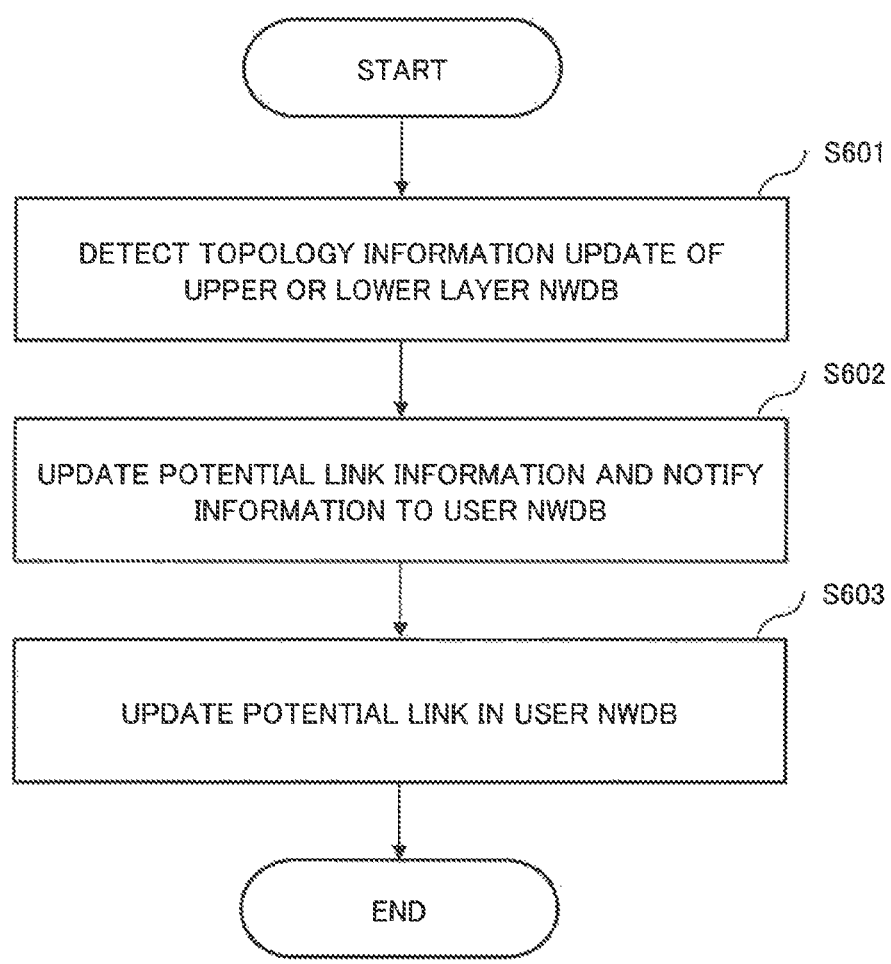
FIG. 18 is a flowchart illustrating a potential link update operation of a network control device according to a third example embodiment.

Referring to a flowchart in FIG. 18, an operation of the third example embodiment will be described. The virtual network information management unit 203 detects a state change in either layer of the network being the upper layer network 32 or the lower layer network 31, through the upper layer NWDB 102 or the lower layer NWDB 103 (Step S601). The detection is performed by a callback or a message notification from the upper layer NWDB 102 or the lower layer NWDB 103 to the external DB access unit 202. Alternatively, the detection is performed by polling to the upper layer NWDB 102 or the lower layer NWDB 103 by the external DB access unit 202.

Next, the virtual network information management unit 203 updates potential link information and notifies most recent potential link information to the user NWDB 101 (Step S602). Processing performed in Step S602 is equivalent to Step S502 according to the second example embodiment.

Next, a potential link in the user NWDB 101 is updated by the potential link notified by the virtual network information management unit 203 (Step S603). Processing performed in Step S603 is equivalent to Step S503 according to the second example embodiment.

Effect

The third example embodiment of the present invention is able to immediately update potential link information recorded in the user NWDB 101, in accordance with a state change of the upper layer network 32 or the lower layer network 31 not caused by the network control device 10. Consequently, connectivity of a potential link recorded in the user NWDB 101 can be maintained. The cause other than the network control device 10 includes a failure, control from another system, setting change, and equipment work.

Fourth Example Embodiment

A network control device according to a fourth example embodiment of the present invention has a configuration similar to the configurations of the network control devices according to the first to third example embodiments. A difference in operation between the present example embodiment and the first to third example embodiments will be described.

Operation

According to the fourth example embodiment of the present invention, a user is able to update a potential link request in the user NWDB 101 through the user request unit 20 at any timing. Consequently, potential link request information in the user NWDB 101 is updated. The virtual network information management unit 203 detects the update through an operation similar to Step S302 according to the first example embodiment. Then, the virtual network information management unit 203 updates potential link information through an operation similar to Step S502 according to the second example embodiment, and notifies most recent potential link information to the user NWDB 101. The user NWDB 101 is updated by the notified most recent potential link information through an operation similar to Step S503 according to the second example embodiment.

When a user adds a potential link request, the user adds the potential link request to the user NWDB 101 through the user request unit 20 at any timing. An operation after the potential link request is added follows the operation according to the first example embodiment.

When a user deletes a potential link request, the user deletes the potential link request from the user NWDB 101 through the user request unit 20 at any timing. An operation after the potential link request is deleted follows the operation in and after Step S602 according to the third example embodiment. Alternatively, the user NWDB 101 may manage the potential link request by soft state.

Specifically, the user NWDB 101 holds a timer for each potential link request and, when a predetermined time elapses from the start of a timer, deletes the potential link information. When an identical potential link request or an update to the identical request is made by the user before the predetermined time elapses from the start of the timer, the timer is reset.

Effect

The fourth example embodiment of the present invention enables a user to always convey a change of request with respect to a potential link to the network control device 10 through the user NWDB 101.

Consequently, the user is always able to be supplied with a desired potential link.

Fifth Example Embodiment

A network control device according to a fifth example embodiment of the present invention handles a three-layered network as a control target. It is assumed that the three layers are referred to as a first layer, a second layer, and a third layer, in an ascending order from the lowest layer.

Configuration

Figure 19:
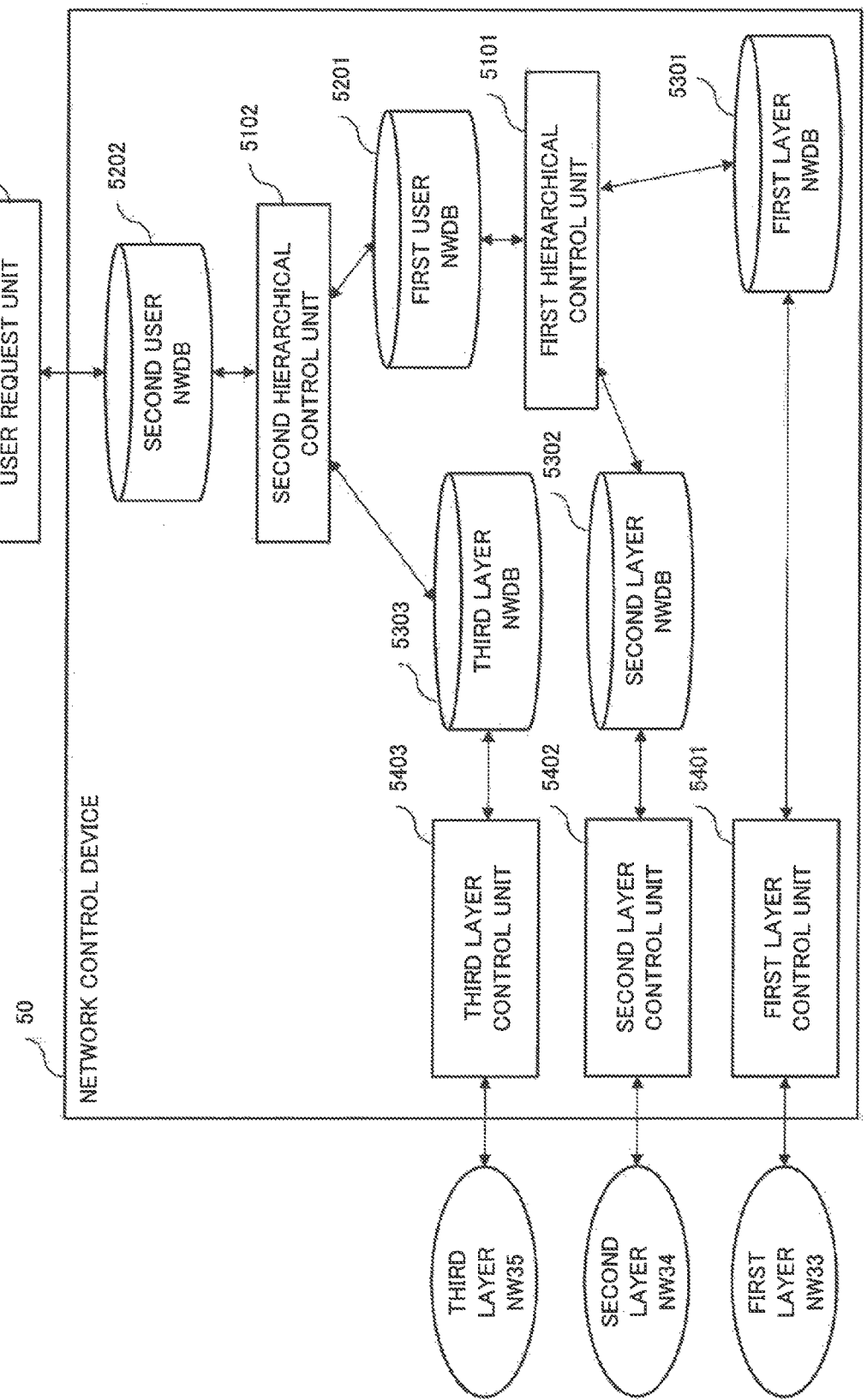
FIG. 19 is a block diagram exemplifying a configuration of a network control device according to a fifth example embodiment.

In FIG. 19, a network control device 50 according to the present example embodiment controls first to third layer networks 33 to 35 in accordance with a flow request by a user from a user request unit 20. The network control device 50 includes first and second hierarchical control units 5101 and 5102, first and second user NWDBs 5201 and 5202, first to third layer NWDBs 5301 to 5303, and first to third layer control units 5401 to 5403.

The first user NWDB 5201 is a user NWDB of the first hierarchical control unit 5101 and also a lower layer NWDB of the second hierarchical control unit 5102. The second user NWDB 5202 is a user NWDB of the second hierarchical control unit 5102.

The first layer NWDB 5301 is a lower layer NWDB of the first hierarchical control unit 5101 and holds network information about a first layer network 33. The second layer NWDB 5302 is an upper layer NWDB of the first hierarchical control unit 5101 and holds network information about a second layer network 34. The third layer NWDB 5303 is an upper layer NWDB of the second hierarchical control unit 5102 and holds network information about a third layer network 35.

The first to third layer control units 5401 to 5403 control the first to third layer networks 33 to 35, respectively, in accordance with respective information changes in the first to third layer NWDBs 5301 to 5303.

Creation of User NWDB

It is assumed as a prerequisite that the first to third layer control units 5401 to 5403 in the network control device 50 acquire network information from the first to third layer networks 33 to 35, respectively. It is further assumed that the first to third layer control units 5401 to 5403 register information about a node, a port, and a link in the first to third layer NWDBs 5301 to 5303, respectively. It is further assumed that information about a layer boundary between the first layer and the second layer, and information about a layer boundary between the second layer and the third layer are set to the first hierarchical control unit 5101 and the second hierarchical control unit 5102, respectively.

Figure 20:
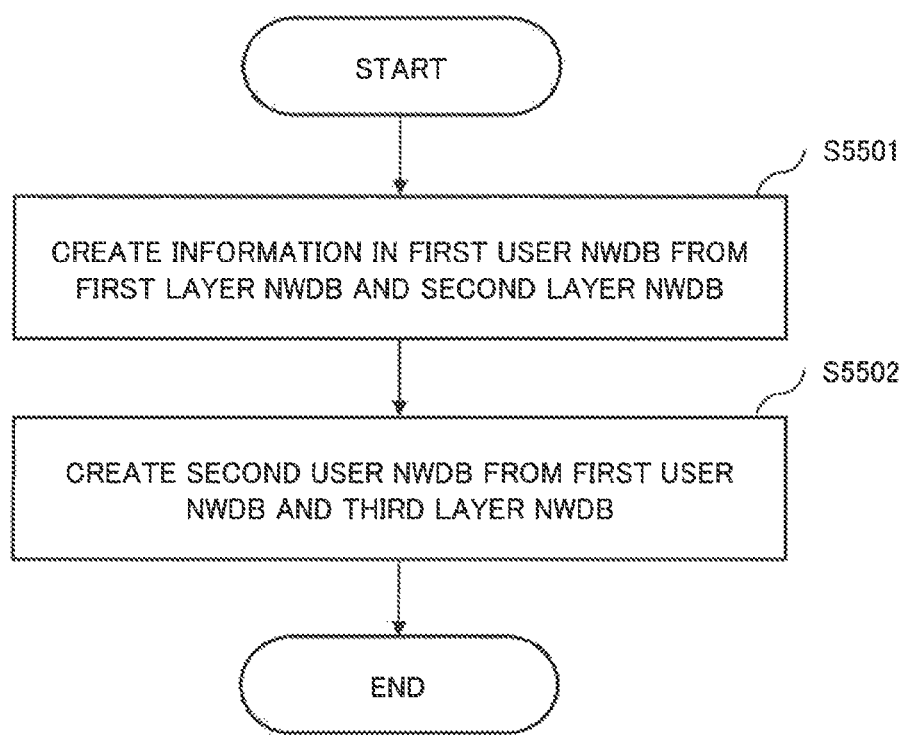
FIG. 20 is a flowchart exemplifying a creation operation of each piece of user NWDB information by the network control device according to the fifth example embodiment.

In FIG. 20, the first hierarchical control unit 5101 creates information in the first user NWDB 5201 with the first layer NWDB 5301 as a lower layer NWDB and the second layer NWDB 5302 as an upper layer NWDB (Step S5501). The specific generation operation is similar to the operation according to the first example embodiment illustrated in FIG. 6.

Next, the second hierarchical control unit 5102 creates information in the second user NWDB 5202 with the first user NWDB 5201 as a lower layer NWDB and the third layer NWDB 5303 as an upper layer NWDB (Step S5502). The specific generation operation is similar to the operation according to the first example embodiment illustrated in FIG. 6. Through the operation described above, the information creation in the first and second user NWDBs 5201 and 5202 is completed.

Operation

Flow Setting Operation

Figure 21:
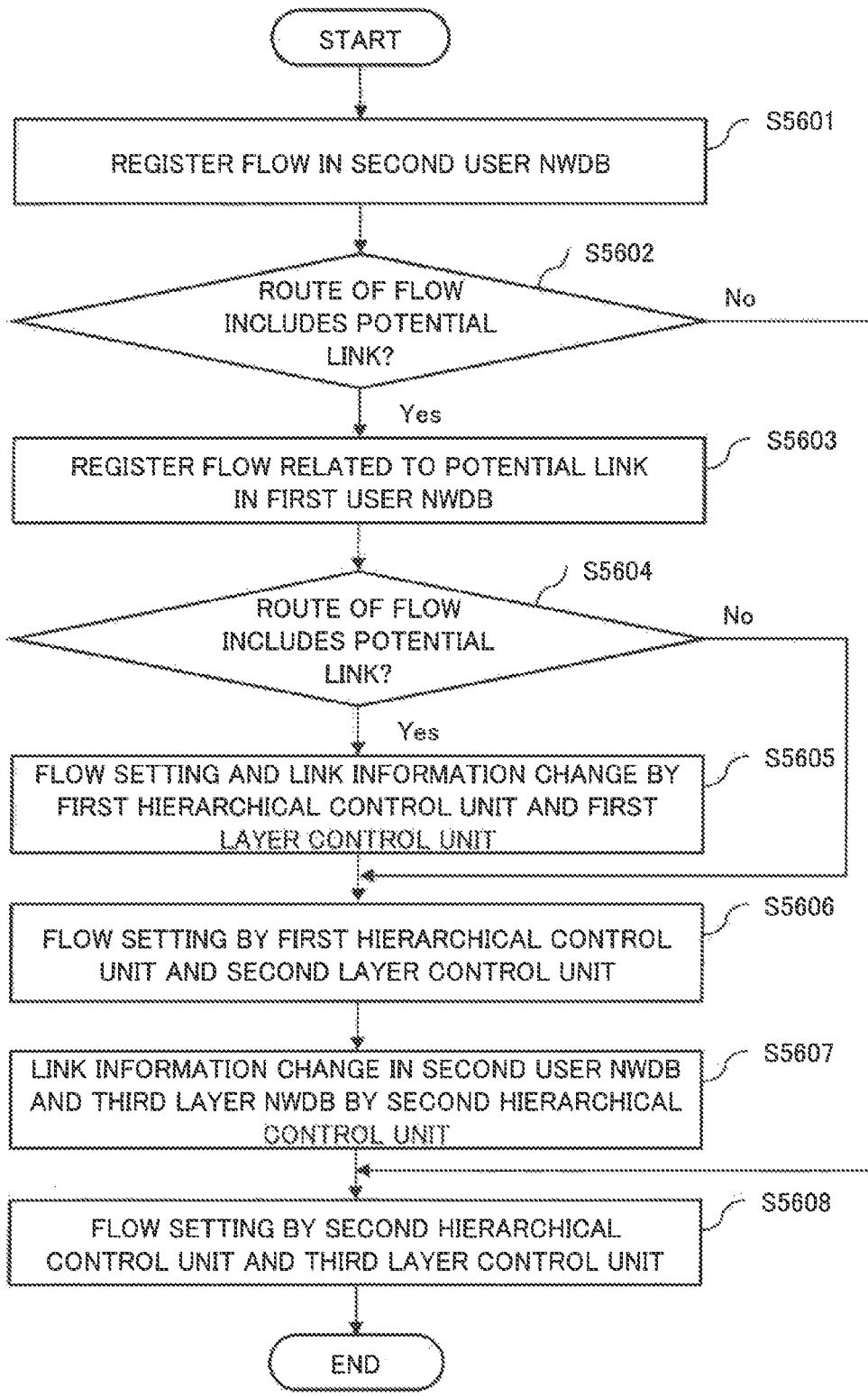
FIG. 21 is a flowchart exemplifying a flow setting operation by the network control device according to the fifth example embodiment.

Next, referring to FIG. 21, a multilayer control operation according to the present example embodiment when a flow is added to the second user NWDB 5202 will be described.

The user request unit 20 refers to topology information in the second user NWDB 5202, performs route calculation of a flow to be set, based on a requirement of the flow, and registers the flow in the second user NWDB 5202 (Step S5601). The specific operation is similar to Step S401 in FIG. 12.

When the flow is registered in the second user NWDB 5202 by the user request unit 20, the second hierarchical control unit 5102 checks whether or not a route of the registered flow includes a potential link (Step S5602). When a potential link is included (Yes in Step S5602), the second hierarchical control unit 5102 registers the flow related to the potential link in the first user NWDB 5201 corresponding to a lower layer NWDB with respect to the second hierarchical control unit 5102 (Step S5603). The specific operation is similar to Step S402 in FIG. 12.

When the flow is registered in the first user NWDB 5201, the first hierarchical control unit 5101 checks whether or not a route of the registered flow includes a potential link (Step S5604). When a potential link is included (Yes in Step S5604), flow registration in the first layer NWDB 5301 by the first hierarchical control unit 5101 and flow setting by the first layer control unit 5401 are performed. Additionally, link information change in the first user NWDB 5201 and link information change in the second layer NWDB 5302 are performed by the first hierarchical control unit 5101 (Step S5605). The specific operations are similar to the first example embodiment, that is, the operations in Steps S403 to S408 (Yes) in FIG. 12.

After completion of Step S5605 or when a potential link is not included (No in Step S5604), flow information about the flow registered in the first user NWDB 5201 is copied to the second layer NWDB 5302 by the first hierarchical control unit 5101. Additionally, flow setting to the second layer network 34 by the second layer control unit 5402 is performed (Step S5606). Specific operations are similar to the first example embodiment, that is, Steps S409 and S410 in FIG. 12.

Step S5606 completes the flow setting to the first user NWDB 5201 being a lower layer NWDB of the second hierarchical control unit 5102. Consequently, the second hierarchical control unit 5102 performs change of a potential link in the second user NWDB 5202 to a set link and link information registration in the third layer NWDB 5303 (Step S5607). The specific operations are similar to the operations according to the first example embodiment, and are equivalent to Steps S405 to S407 in FIG. 12.

After completion of Step S5607 or when a route of a registered flow does not include a potential link (No in Step S5602), the second hierarchical control unit 5102 registers the flow registered in Step S5601 in the third layer NWDB 5303. Additionally, the third layer control unit 5403 sets the flow to the third layer network 35 (Step S5608).

As described above, when a flow is added to the second user NWDB 5202, the network control device 50 performs required setting to the networks 33 to 35 in the first layer, the second layer, and the third layer, respectively.

While an example of a multilayer network composed of three layers has been illustrated, a multilayer network with three layers or more may be similarly controlled by the network control device including [(number of layers)—1] pieces of hierarchical control units.

Effect

As described above, application to control of a network with three layers or more becomes feasible by combining any two or more of internal configurations of the network control devices according to the first to fourth example embodiments, as exemplified in FIG. 19.

Modified Example

As a message including a potential link request or a message notifying a generated potential link (for example, from a lower layer to an upper layer), according to the example embodiment described above, a Path Computation Element Communication Protocol (PCEP) message in which a predetermined value is set to a predetermined field may be used.

Further, a case that a number of an upper layer network and a number of a lower layer network, or a number of each of the first to third layer networks are respectively one, according to the aforementioned example embodiment, has been described for simplification of description. However, at least one of the layers may have more than one networks.

Furthermore, when a plurality of upper layers exist, a storage means holding a policy related to disclosure of a potential link to each upper layer may be provided. At this time, input to path calculation and/or potential link information notified to each upper layer is changed in accordance with the policy. Such a configuration enables flexible control of the respective plurality of upper layers in accordance with the policy.

Application Example

For example, the present invention is applicable to a service by which a carrier promptly provides a virtual network for a user on an on-demand basis. Specifically, the present invention is applicable to a network control part of a virtual private network (VPN) service connecting base networks of a user, and a cloud service connecting a data center and a user base, or data centers, and the like.

The example embodiments of the present invention may also be described as the following supplementary notes but are not limited thereto.

Supplementary Note 1

The same as the network control device according to the aforementioned first aspect.

Supplementary Note 2

The network control device according to supplementary note 1, wherein the performance includes at least one of a bandwidth, a delay, reliability, and priority of the link.

Supplementary Note 3

The network control device according to supplementary note 1 or 2, wherein the hierarchical control unit obtains the link and the performance, based on topology information about a layer boundary between the upper layer network and the lower layer network, and topology information about the lower layer network.

Supplementary Note 4

The network control device according to any one of supplementary notes 1 to 3, wherein the hierarchical control unit obtains a route of the flow, based on topology information about the upper layer network, and the link.

Supplementary Note 5

The network control device according to any one of supplementary notes 1 to 4, wherein the hierarchical control unit periodically performs an operation of obtaining the link and the performance, and holding the link and the performance in an associated manner.

Supplementary Note 6

The network control device according to any one of supplementary notes 1 to 5, wherein the hierarchical control unit performs an operation of obtaining the link and the performance, and holding the link and the performance in an associated manner, when a state of at least either network of the upper layer network or the lower layer network changes.

Supplementary Note 7

A network control device that applies a network control operation by the network control device according to any one of supplementary notes 1 to 6 to at least one set of two networks of neighboring layers out of a plurality of networks in a hierarchy with three levels or more.

Supplementary Note 8

The same as the network control method according to the aforementioned second aspect.

Supplementary Note 9

The network control method according to supplementary note 8, wherein the performance includes at least one item of a bandwidth, a delay, reliability, and priority of the link.

Supplementary Note 10

The network control method according to supplementary note 8 or 9, wherein the network control device obtains the link and the performance, based on topology information about a layer boundary between the upper layer network and the lower layer network, and topology information about the lower layer network.

Supplementary Note 11

The network control method according to any one of supplementary notes 8 to 10, further including, by the network control device, a step of obtaining a route of the flow, based on topology information about the upper layer network, and the link.

Supplementary Note 12

The network control method according to any one of supplementary notes 8 to 11, wherein the network control device periodically performs an operation of obtaining the link and the performance, and holding the link and the performance in an associated manner.

Supplementary Note 13

The network control method according to any one of supplementary notes 8 to 12, wherein the network control device performs an operation of obtaining the link and the performance, and holding the link and the performance in an associated manner, when a state of at least either network of the upper layer network or the lower layer network changes.

Supplementary Note 14

A network control method including, by the network control device, applying the network control method according to any one of supplementary notes 8 to 13 to at least one set of two networks of neighboring layers out of a plurality of networks in a hierarchy with three levels or more.

Supplementary Note 15

The same as the program according to the aforementioned third aspect.

Supplementary Note 16

The program according to supplementary note 15, wherein the performance includes at least one of a bandwidth, a delay, reliability, and priority of the link.

Supplementary Note 17

The program according to supplementary note 15 or 16, further causing the computer to perform processing of obtaining the link and the performance, based on topology information about a layer boundary between the upper layer network and the lower layer network, and topology information about the lower layer network.

Supplementary Note 18

The program according to any one of supplementary notes 15 to 17, further causing the computer to perform processing of obtaining a route of the flow, based on topology information about the upper layer network, and the link.

Supplementary Note 19

The program according to any one of supplementary notes 15 to 18, further causing the computer to perform processing of periodically performing an operation of obtaining the link and the performance, and holding the link and the performance in an associated manner.

Supplementary Note 20

The program according to any one of supplementary notes 15 to 19, further causing the computer to perform processing of performing an operation of obtaining the link and the performance, and holding the link and the performance in an associated manner, when a state of at least either network of the upper layer network or the lower layer network changes.

Supplementary Note 21

A program causing the computer to perform processing of applying a network control operation by the program according to any one of supplementary notes 15 to 20 to at least one set of two networks of neighboring layers out of a plurality of networks in a hierarchy with three levels or more.

The entire disclosure of aforementioned PTLs is incorporated herein by reference thereto. The example embodiments may be changed and adjusted within the scope of the entire disclosure (including the claims) of the present invention, and based on the basic technological concept thereof. Further, within the scope of the entire disclosure of the present invention, various disclosed elements (including the respective elements of the claims, the respective elements of the example embodiments, and the respective elements of the drawings) may be combined and selected in a variety of ways. That is to say, it is apparent that the present invention includes various modifications and changes that may be made by a person skilled in the art, in accordance with the entire disclosure including the claims, and the technological concept. In particular, with regard to numerical ranges described herein, any numerical values and small ranges included in the relevant ranges should be interpreted to be specifically described even when there is no particular description thereof. This application claims priority based on Japanese Patent Application No. 2015-044737 filed on Mar. 6, 2015, the disclosure of which is hereby incorporated by reference thereto in its entirety.

REFERENCE SIGNS LIST

1 Network control device
2 Database
3 Hierarchical control unit
10 Network control device
20 User request unit
31 Lower layer network
32 Upper layer network
33 First layer network
34 Second layer network
35 Third layer network
40 Layer boundary
50 Network control device
101 User NWDB
101A, 102A, 103A Node information
101B, 102B, 103B Port information
101C, 102C, 103C Link information
101D, 102D, 103D Flow information
102 Upper layer NWDB
103 Lower layer NWDB
104 Hierarchical control unit
105 Upper layer control unit
106 Lower layer control unit
202 External DB access unit
203 Virtual network information management unit
204 Layer boundary information management unit
205 Inter-DB-information correspondence management unit
206 Path calculation unit
301 Path calculation scheduler
302 Path calculation request DB
303 Potential link DB
5101 First hierarchical control unit
5102 Second hierarchical control unit
5201 First user NWDB
5202 Second user NWDB
5301 First layer NWDB
5302 Second layer NWDB
5303 Third layer NWDB
5401 First layer control unit
5402 Second layer control unit
5403 Third layer control unit
B501 to B506 Boundary connection (link)
F701 Requested flow
F702 Upper layer flow
F703, F704 Flow set to a lower layer
L001, L002 Upper layer link
L601 to L603 Lower layer link
L901 to L903 Potential link
N11 to N13, N21 to N23 Node
P301 to P310, P401 to P412 Port
P801 to P806 Virtual port

The invention claimed is:

1. A network control device comprising:
a database that accepts a request for connecting ports on nodes included in an upper layer network; and
a hierarchical controller configured to obtain a link connecting the ports through a lower layer network and performance of the link, based on topology information about a layer boundary between the upper layer network and the lower layer network, and topology information about the lower layer network, and holding the link and the performance in an associated manner, wherein
the database accepts a flow between nodes included in the upper layer network, the flow being selected depending on the link and the performance, and, when a route of the flow includes the link, the hierarchical controller sets a flow related to the link to the lower layer network.

2. The network control device according to claim 1, wherein the performance includes at least one of a bandwidth, a delay, reliability, and priority of the link.

3. A network control method comprising, by a network control device:

accepting a request for connecting ports on nodes included in an upper layer network;

obtaining a link connecting the ports through a lower layer network and performance of the link, based on topology information about a layer boundary between the upper layer network and the lower layer network, and topology information about the lower layer network, and holding the link and the performance in an associated manner;

accepting a flow between nodes included in the upper layer network, the flow being selected depending on the link and the performance; and, when a route of the flow includes the link, setting a flow related to the link to the lower layer network.

4. A non-transitory computer readable recording medium for a program to causing a computer to achieve:

processing of accepting a request for connecting ports on nodes included in an upper layer network;

processing of obtaining a link connecting the ports through a lower layer network and performance of the link, based on topology information about a layer boundary between the upper layer network and the lower layer network, and topology information about the lower layer network, and holding the link and the performance in an associated manner;

processing of accepting a flow between nodes included in the upper layer network, the flow being selected depending on the link and the performance; and processing of, when a route of the flow includes the link, setting a flow related to the link to the lower layer network.

5. The network control device according to claim 1, wherein the hierarchical controller obtains a route of the flow, based on topology information about the upper layer network, and the link.

6. The network control device according to claim 1, wherein the hierarchical controller periodically performs an operation of obtaining the link and the performance, and holding the link and the performance in an associated manner.

7. The network control device according to claim 1, wherein the hierarchical controller performs an operation of obtaining the link and the performance, and holding the link and the performance in an associated manner, when a state of at least either network of the upper layer network or the lower layer network changes.

8. A network control device that applies a network control operation by the network control device according to claim 1, to at least one set of two networks of neighboring layers out of a plurality of networks in a hierarchy with three levels or more.

* * * * *